United States Patent
Yang et al.

(10) Patent No.: US 11,831,580 B2
(45) Date of Patent: *Nov. 28, 2023

(54) METHOD AND APPARATUS FOR TRANSMITTING OR RECEIVING WIRELESS SIGNAL IN WIRELESS COMMUNICATION SYSTEM

(71) Applicant: LG Electronics Inc., Seoul (KR)

(72) Inventors: Suckchel Yang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/090,971

(22) Filed: Dec. 29, 2022

(65) Prior Publication Data

US 2023/0145092 A1 May 11, 2023

Related U.S. Application Data

(63) Continuation of application No. 17/694,939, filed on Mar. 15, 2022, now Pat. No. 11,563,547, which is a
(Continued)

(51) Int. Cl.
*H04W 4/00* (2018.01)
*H04L 5/00* (2006.01)
(Continued)

(52) U.S. Cl.
CPC .......... *H04L 5/0055* (2013.01); *H04W 16/14* (2013.01); *H04W 72/23* (2023.01)

(58) Field of Classification Search
CPC ...... H04L 5/0055; H04W 72/23; H04W 16/14
See application file for complete search history.

(56) References Cited

U.S. PATENT DOCUMENTS

| 11,349,614 B2 | 5/2022 | Karaki et al. |
| 2019/0103943 A1* | 4/2019 | Wang .................. H04L 1/1854 |

(Continued)

FOREIGN PATENT DOCUMENTS

| KR | 20180091527 | 8/2018 |
| KR | 20190028352 | 3/2019 |

OTHER PUBLICATIONS

Extended European Search Report in European Appln. No. Application No./Patent No. 20876674.1, dated Oct. 31, 2022, 11 pages.
(Continued)

*Primary Examiner* — Siren Wei
(74) *Attorney, Agent, or Firm* — Fish & Richardson P.C.

(57) ABSTRACT

The present disclosure relates to a wireless communication system, and specifically, a method and an apparatus therefor, the method comprising: generating first A/N information for a first PDSCH group and second A/N information for a second PDSCH group, wherein each PDSCH group is a basic group for an A/N request; based on an A/N for a specific PDSCH not belonging to any PDSCH group being transmitted with the first and second A/N information, appending the A/N for the specific PDSCH after the first and second A/N information; and transmitting control information including the first and second A/N information and the A/N for the specific PDSCH.

7 Claims, 23 Drawing Sheets

Related U.S. Application Data continuation of application No. PCT/KR2020/014121, filed on Oct. 15, 2020.

(60) Provisional application No. 62/923,436, filed on Oct. 18, 2019, provisional application No. 62/915,620, filed on Oct. 15, 2019.

(51) Int. Cl.
  *H04W 16/14* (2009.01)
  *H04W 72/23* (2023.01)

(56) References Cited

U.S. PATENT DOCUMENTS

| | | | |
|---|---|---|---|
| 2019/0261354 A1 | 8/2019 | Fakoorian et al. | |
| 2020/0228173 A1* | 7/2020 | Ye | H04L 5/0055 |
| 2021/0105102 A1* | 4/2021 | Li | H04L 1/1896 |
| 2022/0330297 A1* | 10/2022 | Lei | H04L 5/0055 |

OTHER PUBLICATIONS

Fujitsu, "Discussion on DL SPS enhancement," R1-1910189, Presented at 3GPP TSG RAN WG1 #98bis, Chongqing, China, Oct. 14-20, 2019, 3 pages.

Huawei & HiSilicon, "Discussion on SPS HARQ-ACK bit handling in case of dynamic codebook," R1-162105, Presented at 3GPP TSG RAN WGI Meeting #84bis, Busan, Korea, Apr. 11-15, 2016, 5 pages.

Huawei & HiSilicon, "Other aspects for URLLC/IIOT enhancements," R1-1910398, Presented at 3GPP TSG RAN WGI Meeting #98bis, Chongqing, China, Oct. 14-20, 2019, 7 pages.

Oppo, "HARQ enhancements for NR-U," R1-1910792, Presented at 3GPP TSG RAN WG1 #98bis, Chongqing, China, Oct. 14-20, 2019, 7 pages.

* cited by examiner (a) Carrier aggregation between L-band and U-band (b) Standalone U-band(s)

FIG. 12A
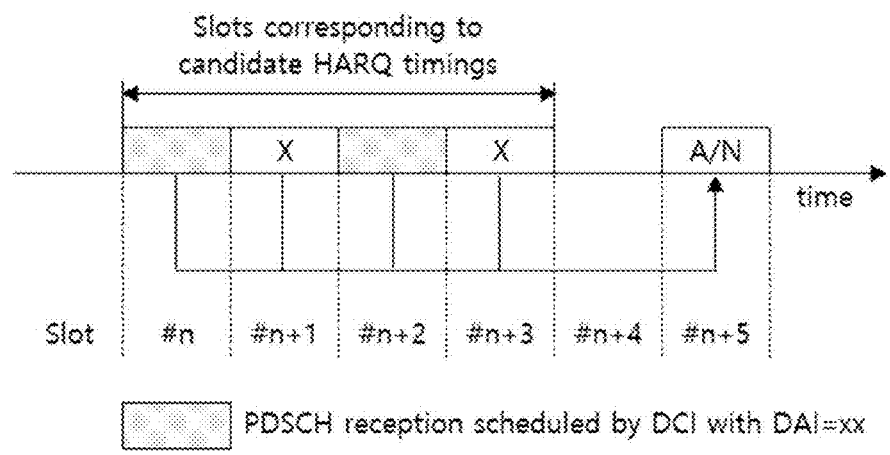
FIG. 12B    t-A/N without DAI signaling
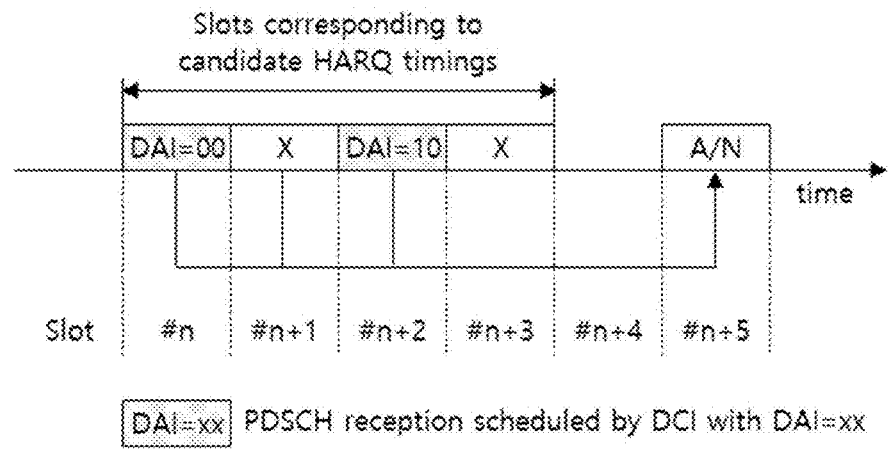
t-A/N with DAI signaling

METHOD AND APPARATUS FOR TRANSMITTING OR RECEIVING WIRELESS SIGNAL IN WIRELESS COMMUNICATION SYSTEM

CROSS-REFERENCE TO RELATED APPLICATIONS

This application is a continuation of U.S. application Ser. No. 17/694,939, filed on Mar. 15, 2022, which is a continuation of International Application No. PCT/KR2020/014121, filed on Oct. 15, 2020, which claims the benefit of an earlier filing date and right of priority to U.S. Provisional Application No. 62/915,620, filed on Oct. 15, 2019, and U.S. Provisional Application No. 62/923,436, filed on Oct. 18, 2019, the contents of which are all hereby incorporated by reference herein in their entirety.

TECHNICAL FIELD

The present disclosure relates to a wireless communication system, and in more detail, relates to a method and an apparatus of transmitting and receiving a wireless signal in a wireless communication system.

BACKGROUND

Wireless communication systems have been widely deployed to provide various types of communication services such as voice and data. In general, a wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system, etc.

SUMMARY

An object of the present disclosure is to provide a method and an apparatus of efficiently performing a wireless signal transmission/reception process.

The technical objects to be achieved by the present disclosure are not limited to the above-described technical objects, and other technical objects which are not described herein will be clearly understood by those skilled in the pertinent art from the following description.

In a first aspect of the present disclosure, a method used by a user equipment (UE) in a wireless communication system is provided, the method includes generating first acknowledgement/negative acknowledgement (A/N) information for a first physical downlink shared channel (PDSCH) group and second A/N information for a second PDSCH group, wherein each PDSCH group is a basic group for an A/N request; based on an A/N for a specific PDSCH not belonging to any PDSCH group being transmitted with the first and second A/N information, appending the A/N for the specific PDSCH after the first and second A/N information; and transmitting control information including the first and second A/N information and the A/N for the specific PDSCH.

In a second aspect of the present disclosure, a UE used in a wireless communication system is provided, the UE may include at least one transceiver; at least one processor; and at least one computer memory operatively connected to the at least one processor and, when executed, causing the at least one processor to perform an operation, the operation includes generating first acknowledgement/negative acknowledgement (A/N) information for a first physical downlink shared channel (PDSCH) group and second A/N information for a second PDSCH group, wherein each PDSCH group is a basic group for an A/N request; based on an A/N for a specific PDSCH not belonging to any PDSCH group being transmitted with the first and second A/N information, appending the A/N for the specific PDSCH after the first and second A/N information; and transmitting control information including the first and second A/N information and the A/N for the specific PDSCH.

In a third aspect of the present disclosure, a device for a UE is provided, the device may include at least one processor; and at least one computer memory operatively connected to the at least one processor and, when executed, causing the at least one processor to perform an operation, the operation includes generating first acknowledgement/negative acknowledgement (A/N) information for a first physical downlink shared channel (PDSCH) group and second A/N information for a second PDSCH group, wherein each PDSCH group is a basic group for an A/N request; based on an A/N for a specific PDSCH not belonging to any PDSCH group being transmitted with the first and second A/N information, appending the A/N for the specific PDSCH after the first and second A/N information; and transmitting control information including the first and second A/N information and the A/N for the specific PDSCH.

In a fourth aspect of the present disclosure, a computer-readable medium storing at least one computer program, when executed, causing the at least one processor to perform an operation is provided, the operation includes generating first acknowledgement/negative acknowledgement (A/N) information for a first physical downlink shared channel (PDSCH) group and second A/N information for a second PDSCH group, wherein each PDSCH group is a basic group for an A/N request; based on an A/N for a specific PDSCH not belonging to any PDSCH group being transmitted with the first and second A/N information, appending the A/N for the specific PDSCH after the first and second A/N information; and transmitting control information including the first and second A/N information and the A/N for the specific PDSCH.

In a fifth aspect of the present disclosure, a method performed by a base station in a wireless communication system is provided, the method includes transmitting at least one PDSCH belonging to a first physical downlink shared channel (PDSCH) group and at least one PDSCH belonging to a second PDSCH group, wherein each PDSCH group is a basic group for an acknowledgement/negative acknowledgement (A/N) request; transmitting a specific PDSCH that does not belong to any PDSCH group; and receiving control information including first A/N information for the first PDSCH group, second A/N information for a second PDSCH group, and an A/N for the specific PDSCH, wherein the A/N for the specific PDSCH is located after the first and second A/N information.

In a sixth aspect of the present disclosure, a base station used in a wireless communication system is provided, the base station may include at least one transceiver; at least one processor; and at least one computer memory operatively connected to the at least one processor and, when executed, causing the at least one processor to perform an operation, the operation includes transmitting at least one PDSCH belonging to a first physical downlink shared channel (PDSCH) group and at least one PDSCH belonging to a second PDSCH group, wherein each PDSCH group is a basic group for an acknowledgement/negative acknowledgement (A/N) request; transmitting a specific PDSCH that does not belong to any PDSCH group; and receiving control information including first A/N information for the first PDSCH group, second A/N information for a second PDSCH group, and an A/N for the specific PDSCH, wherein the A/N for the specific PDSCH is located after the first and second A/N information.

Preferably, the specific PDSCH may include a semi-persistent scheduling (SPS) PDSCH.

Preferably, A/N retransmission may be allowed for the first and second A/N information, respectively, but A/N retransmission may not be allowed for the A/N for the SPS PDSCH.

Preferably, receiving downlink control information (DCI) for PDSCH scheduling may be further included, and the DCI may include A/N request information for the first PDSCH group and A/N request information for the second PDSCH group.

Preferably, the control information may be transmitted in an unlicensed band.

According to the present disclosure, it is possible to efficiently transmit and receive wireless signals in a wireless communication system.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

FIGS. 12A to 14 illustrate A/N transmission according to an embodiment of the present disclosure.

DETAILED DESCRIPTION

The following description may be used for a variety of radio access systems such as code division multiple access (CDMA), frequency division multiple access (FDMA), time division multiple access (TDMA), orthogonal frequency division multiple access (OFDMA), single carrier frequency division multiple access (SC-FDMA), etc. CDMA may be implemented by a radio technology such as Universal Terrestrial Radio Access (UTRA) or CDMA2000. TDMA may be implemented by a radio technology such as Global System for Mobile communications (GSM)/General Packet Radio Service (GPRS)/Enhanced Data Rates for GSM Evolution (EDGE). OFDMA may be implemented by a radio technology such as IEEE 802.11 (Wi-Fi), IEEE 802.16 (WiMAX), IEEE 802-20, Evolved UTRA (E-UTRA), etc. UTRA is a part of the Universal Mobile Telecommunications System (UMTS). 3GPP (3rd Generation Partnership Project) long term evolution (LTE) is a part of an Evolved UNITS (E-UMTS) using E-UTRA and LTE-A (Advanced) is an advanced version of 3GPP LTE. 3GPP NR (New Radio or New Radio Access Technology) is an advanced version of 3GPP LTE/LTE-A.

As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure.

To clarify description, it is described based on a 3GPP NR, but a technical idea of the present disclosure is not limited thereto.

In a wireless communication system, a user equipment receives information through a downlink (DL) from a base station, and a user equipment transmits information through an uplink (UL) to a base station. Information transmitted and received between a base station and a user equipment includes data and various control information, and various physical channels exist according to the type/use of the information they transmit and receive.

Figure 1:
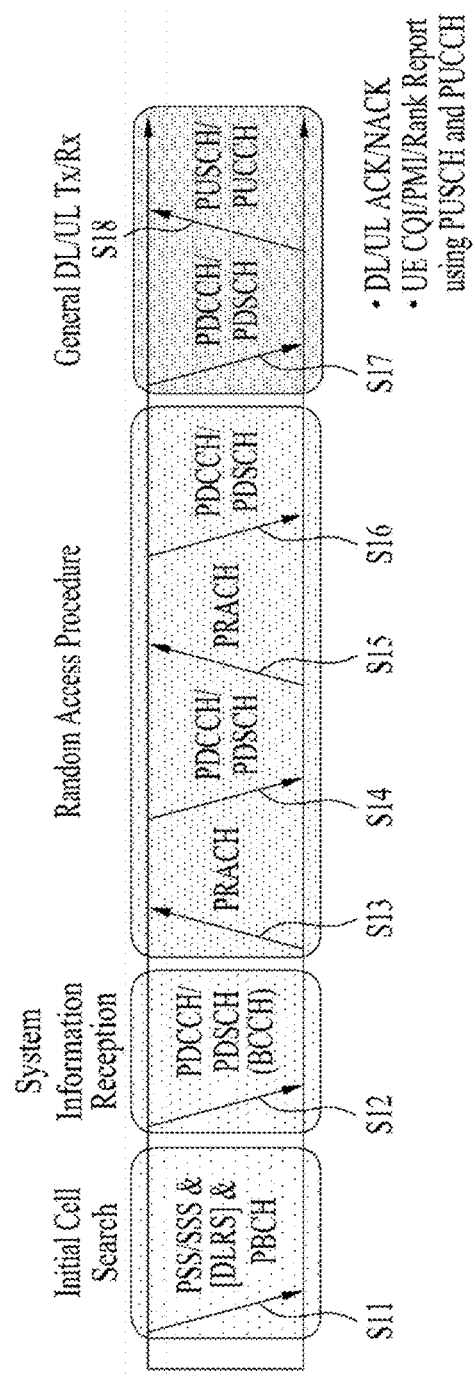
FIG. 1 illustrates physical channels used in a 3GPP system, which is an example of a wireless communication system, and a general signal transmission method using them.

FIG. 1 illustrates physical channels used in a 3GPP NR system, and a general signal transmission method using them.

When a terminal is turned on or newly enters a cell in a state in which the terminal was turned off, it performs an initial cell search by including synchronization with a base station or the like in step S101. For the initial cell search, a terminal receives a synchronization signal block (SSB) from a base station. SSB includes a primary synchronization signal (PSS), a secondary synchronization signal (SSS) and a physical broadcast channel (PBCH). A terminal synchronizes with a base station based on PSS/SSS, and obtains information such as cell identifier (ID), etc. In addition, a terminal may obtain broadcasting information in a cell based on a PBCH. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to a physical downlink control channel in step S102.

Thereafter, a terminal may perform a random access procedure such as steps S103 to S106 to complete access to a base station. For the random access procedure, a terminal may transmit a preamble through a physical random access channel (PRACH) (S103), and may receive a response message to a preamble through a physical downlink control channel and a corresponding physical downlink shared channel (S104). In a case of contention based random access, a contention resolution procedure may be performed such as transmission of an additional physical random access channel (S105) and reception of a physical downlink control channel and a corresponding physical downlink shared channel (S106).

A terminal which performed the above-described procedure subsequently may perform a physical downlink control channel/a physical downlink shared channel reception (S107) and a physical uplink shared channel (PUSCH)/a physical uplink control channel (PUCCH) transmission (S108) as a general uplink/downlink signal transmission procedure. Control information transmitted by a terminal to a base station is referred to as uplink control information (UCI). UCI includes a Hybrid Automatic Repeat and reQuest Acknowledgment/Negative-ACK (HARQ ACK/NACK), a Scheduling Request (SR), a Channel State Information (CSI), etc. CSI includes a Channel Quality Indicator (CQI), a Precoding Matrix Indicator (PMI), a Rank Indication (RI), etc. The UCI is generally transmitted through PUCCH, but may be transmitted through PUSCH when control information and traffic data are to be transmitted at the same time. In addition, the UCI may be transmitted aperiodically through PUSCH according to a request/indication of a network.

Figure 2:
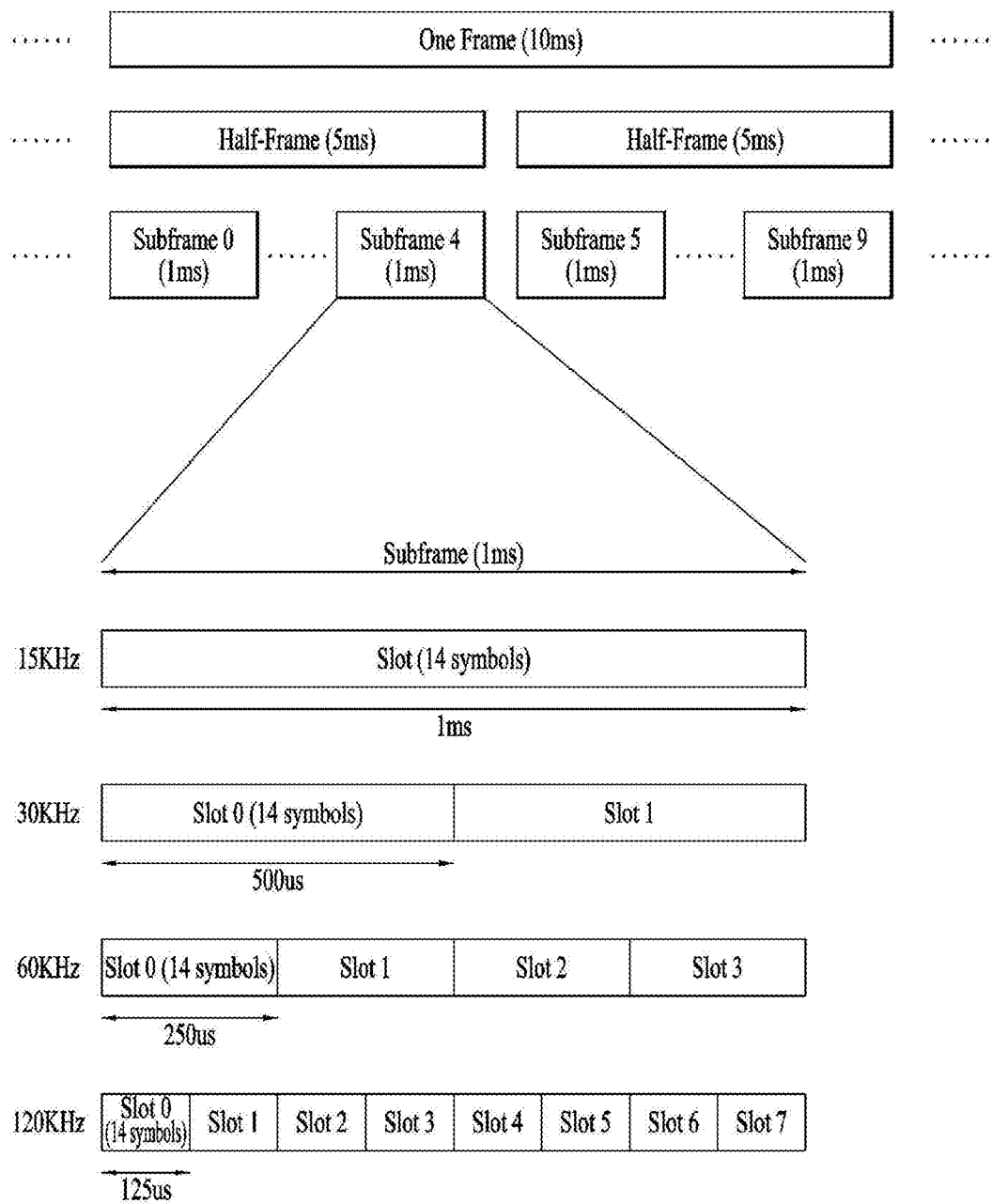
FIG. 2 illustrates a frame structure.

FIG. 2 illustrates a frame structure. In NR, uplink and downlink transmission is configured as frames. Each radio frame has a length of 10 ms and is divided into two 5 ms half-frames (HF). Each half-frame is divided into 5 1 ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 illustrates that the number of symbols per slot, the number of slots per frame, and the number of slots per subframe vary according to SCS when a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: number of symbols in a slot
*$N^{frame,u}_{slot}$: the number of slots in a frame
*$N^{subframe,u}_{slot}$: the number of slots in a subframe Table 2 illustrates that the number of symbols per slot, the number of slots per frame, and the number of slots per subframe vary according to SCS, when an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

A structure of a frame is merely an example, and the number of subframes, the number of slots, and the number of symbols in a frame may be variously changed.

In a NR system, OFDM numerology (e.g., SCS) may be configured differently between a plurality of cells aggregated into one UE. Accordingly, an (absolute time) duration of a time resource (e.g., SF, slot, or TTI) (referred to as TU (Time Unit) for convenience) composed of the same number of symbols may be configured differently between aggregated cells. Here, the symbol may include an OFDM symbol (or a CP-OFDM symbol) and an SC-FDMA symbol (or a Discrete Fourier Transform-spread-OFDM, DFT-s-OFDM symbol).

Figure 3:
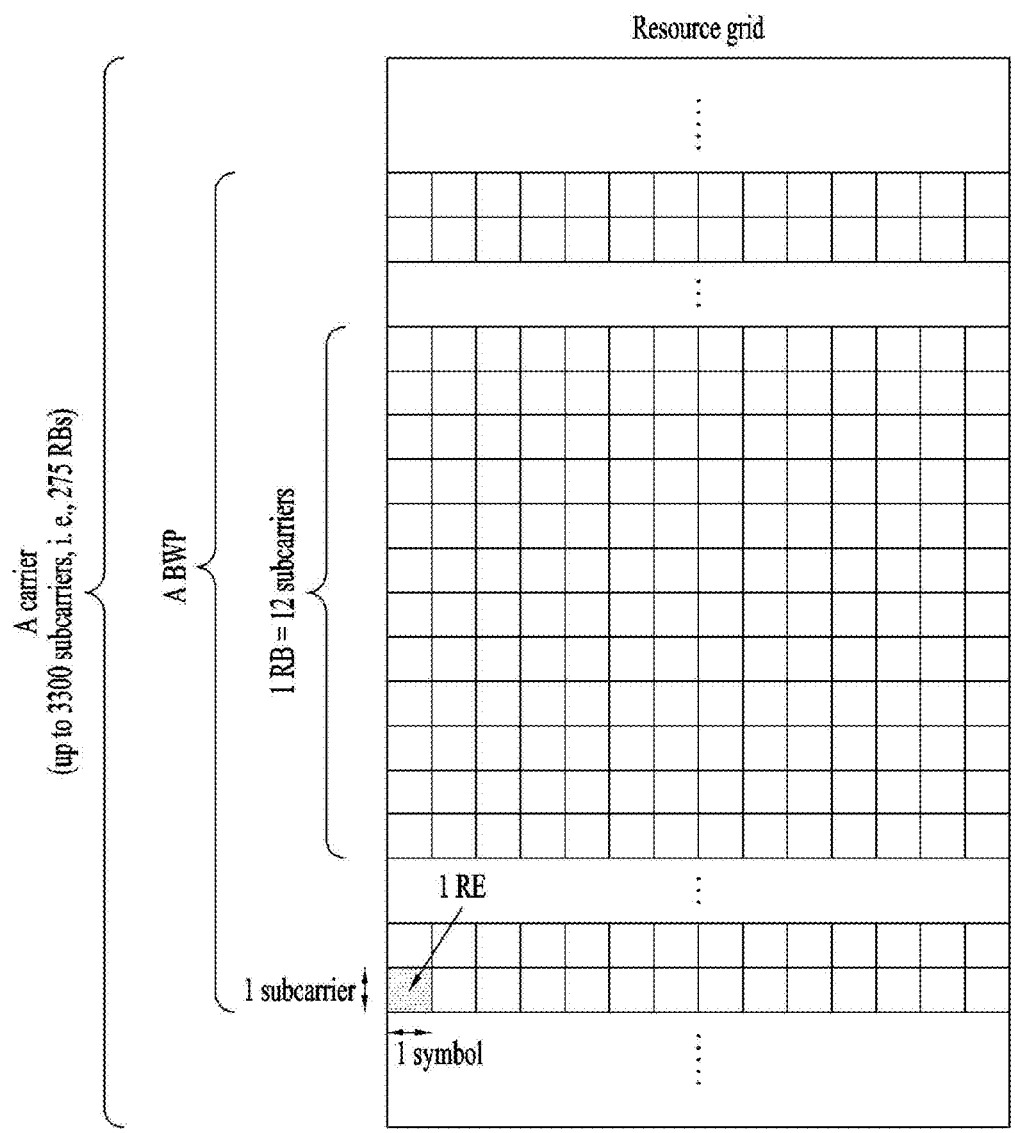
FIG. 3 illustrates a resource grid of a slot.

FIG. 3 illustrates a resource grid of a slot. A slot includes a plurality of symbols in a time domain. For example, in the case of a normal CP, one slot includes 14 symbols, but in the case of an extended CP, one slot includes 12 symbols. The carrier includes a plurality of subcarriers in a frequency domain. A resource block (RB) is defined as a plurality (e.g., 12) of consecutive subcarriers in a frequency domain. A bandwidth part (BWP) is defined as a plurality of consecutive physical RBs (PRBs) in a frequency domain, and may correspond to one numerology (e.g., SCS, CP length, etc.). A carrier may include a maximum of N (e.g., 5) BWPs. Data communication is performed through an activated BWP, and only one BWP can be activated for one UE. Each element in the resource grid is referred to as a resource element (RE), and one complex symbol may be mapped.

Figure 4:
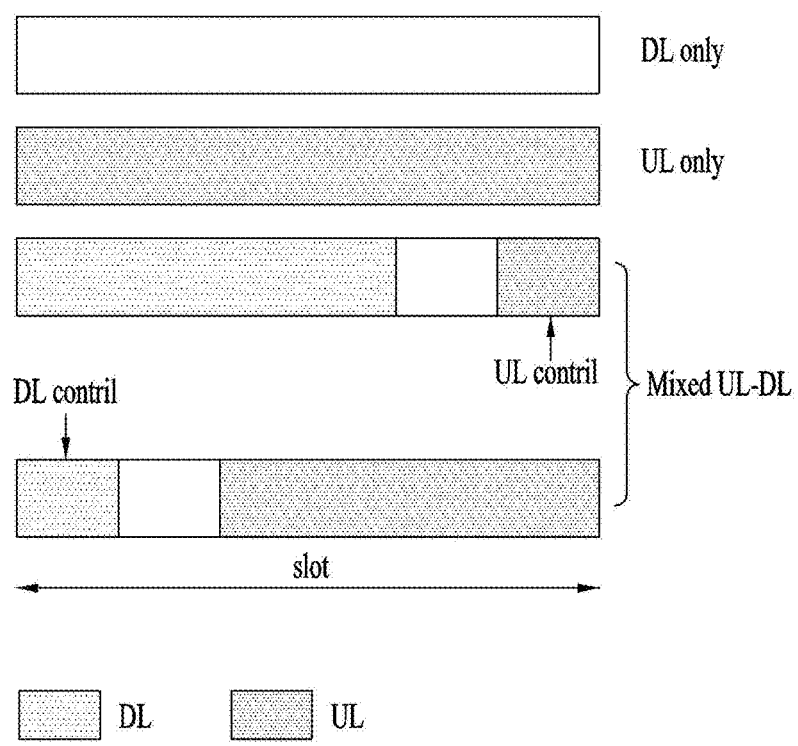
FIG. 4 illustrates a structure of a self-contained slot.

FIG. 4 illustrates a structure of a self-contained slot. In a NR system, a frame is characterized by a self-contained structure in which a DL control channel, DL or UL data, and a UL control channel can all be included in one slot. For example, the first N symbols in a slot may be used to transmit a DL control channel (hereinafter, DL control region), and the last M symbols in a slot may be used to transmit a UL control channel (hereinafter, UL control region). N and M are each an integer greater than or equal to 0. A resource region (hereinafter, referred to as a data region) between the DL control region and the UL control region may be used for DL data transmission or for UL data transmission. A time gap for DL-to-UL or UL-to-DL switching may exist between the control region and the data region. As an example, the following configuration may be considered. Each duration is listed in chronological order.

Figure 5:
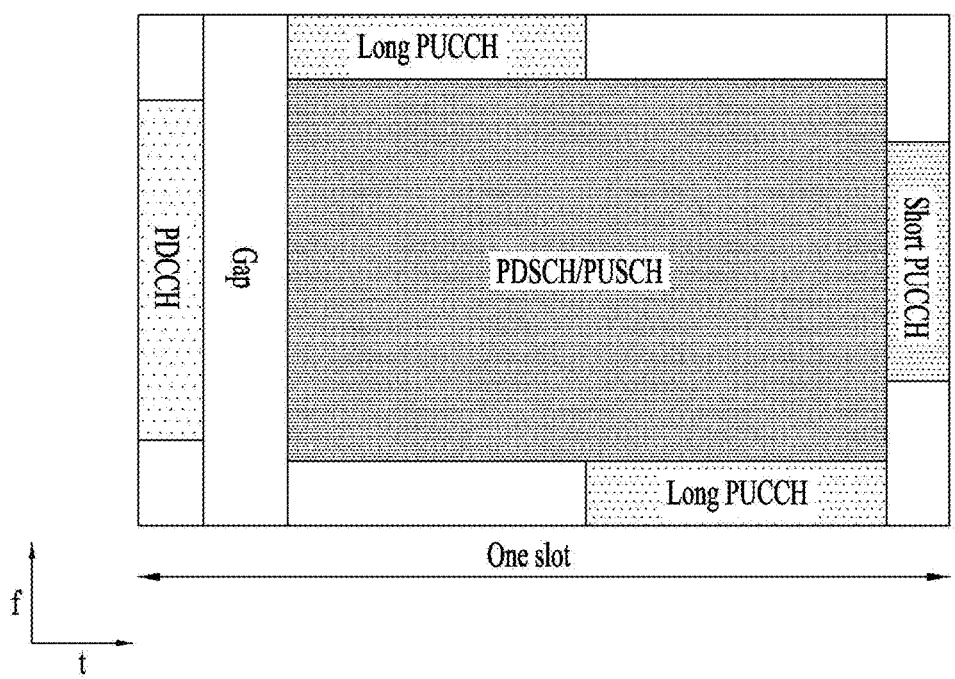
FIG. 5 illustrates an example in which a physical channel is mapped in a self-contained slot.

1. DL only configuration
2. UL only configuration
3. Mixed UL-DL configuration
   DL region+Guard Period (GP)+UL control region
   DL control region+GP+UL region
   DL region: (i) DL data region, (ii) DL control region+ DL data region
   UL region: (i) UL data region, (ii) UL data region+UL control region FIG. 5 illustrates an example in which a physical channel is mapped in a self-contained slot. A PDCCH may be transmitted in a DL control region, and a PDSCH may be transmitted in a DL data region. A PUCCH may be transmitted in a UL control region, and a PUSCH may be transmitted in a UL data region. A GP provides a time gap in the process of a base station and a UE switching from a transmission mode to a reception mode or in the process of switching from a reception mode to a transmission mode. Some symbols of the time of switching from DL to UL in a subframe may be configured to GP.

Hereinafter, each physical channel will be described in more detail.

A PDCCH carries Downlink Control Information (DCI). For example, PCCCH (i.e., DCI) carries a transmission format and resource allocation of a downlink shared channel (DL-SCH), resource allocation information for an uplink shared channel (UL-SCH), paging information for a paging channel (PCH), system information on a DL-SCH, resource allocation information for a higher layer control message such as a random access response transmitted on a PDSCH, a transmission power control command, activation/deactivation of Configured Scheduling (CS), etc. DCI includes a cyclic redundancy check (CRC), and a CRC is masked/scrambled with various identifiers (e.g., Radio Network Temporary Identifier, RNTI) according to an owner or use purpose of a PDCCH. For example, if a PDCCH is for a specific UE, a CRC is masked with a UE identifier (e.g., Cell-RNTI, C-RNTI). If a PDCCH relates to paging, a CRC is masked with a Paging-RNTI (P-RNTI). If a PDCCH relates to system information (e.g., System Information Block, SIB), a CRC is masked with a System Information RNTI (SI-RNTI). If a PDCCH relates to a random access response, a CRC is masked with a random access-RNTI (RA-RNTI).

A PDCCH is configured as 1, 2, 4, 8, 16 CCEs (Control Channel Elements) according to an Aggregation Level (AL). A CCE is a logical allocation unit used to provide a PDCCH of a predetermined code rate according to a radio channel state. A CCE includes 6 REGs (Resource Element Groups). A REG is defined by one OFDM symbol and one (P)RB. A PDCCH is transmitted through a control resource set (CORESET). A CORESET is defined as a set of REGs with a given numerology (e.g., SCS, CP length, etc.). A plurality of CORESETs for one UE may overlap in a time/frequency domain. A CORESET may be configured by system information (e.g., Master Information Block, MIB) or UE-specific higher layer (e.g., Radio Resource Control, RRC, layer) signaling. Specifically, the number of RBs and the number of OFDM symbols (maximum 3) included CORESET may be configured by higher layer signaling.

For PDCCH reception/detection, a UE monitors PDCCH candidates. A PDCCH candidate represents CCE(s) that a UE is required to monitor for PDCCH detection. Each PDCCH candidate is defined as 1, 2, 4, 8, or 16 CCEs according to an AL. Monitoring includes (blind) decoding of PDCCH candidates. A set of PDCCH candidates monitored by a UE is defined as a PDCCH search space (SS). A search space includes a common search space (CSS) or a UE-specific search space (USS). A UE may acquire DCI by monitoring PDCCH candidates in one or more search spaces configured by MIB or higher layer signaling. Each CORESET is associated with one or more search spaces, and each search space is associated with one CORESET. A search space may be defined based on the following parameters.

controlResourceSetId: indicates a CORESET associated with a search space
  monitoringSlotPeriodicityAndOffset: indicates a PDCCH monitoring period (slot unit) and a PDCCH monitoring duration offset (slot unit)
  monitoringSymbolsWithinSlot: indicates the PDCCH monitoring symbol in the slot (eg indicates the first symbol(s) of CORESET)
  nrofCandidates: indicates the number of PDCCH candidates (one of 0, 1, 2, 3, 4, 5, 6, 8) for each AL={1, 2, 4, 8, 16}

An occasion (e.g., time/frequency resource) to monitor PDCCH candidates is defined as a PDCCH (monitoring) occasion. One or more PDCCH (monitoring) occasions may be configured within a slot.

Table 3 illustrates the features of each search space type

TABLE 3

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 illustrates DCI formats transmitted on a PDCCH.

TABLE 4

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used for scheduling a TB-based (or TB-level) PUSCH, and DCI format 0_1 may be used for scheduling a TB-based (or TB-level) PUSCH or a CBG (Code Block Group)-based (or CBG-level) PUSCH. DCI format 1_0 may be used for scheduling a TB-based (or TB-level) PDSCH, and DCI format 1_1 may be used for scheduling a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or UL scheduling information. DCI format 2_0 is used for transmitting dynamic slot format information (e.g., dynamic SFI) to a UE, and DCI format 2_1 is used for transmitting downlink pre-emption information to a UE. DCI format 2_0 and/or DCI format 2_1 may be transmitted to user equipments in a corresponding group through a group common PDCCH, which is a PDCCH transmitted to UEs defined as one group.

DCI format 0_0 and DCI format 1_0 may be referred to as a fallback DCI format, and DCI format 0_1 and DCI format 1_1 may be referred to as a non-fallback DCI format. A fallback DCI format has the same DCI size/field configuration regardless of a UE configuration. On the other hand, a non-fallback DCI format has a different DCI size/field configuration according to a UE configuration.

A PDSCH carries downlink data (e.g., DL-SCH transport block, DL-SCH TB), and modulation methods such as QPSK (Quadrature Phase Shift Keying), 16 QAM (Quadrature Amplitude Modulation), 64 QAM, 256 QAM, etc. are applied to the PDSCH. A codeword is generated by encoding a TB. A PDSCH can carry up to two codewords. Scrambling and modulation mapping are performed for each codeword, and modulation symbols generated from each codeword may be mapped to one or more layers. Each layer is mapped to a resource together with a demodulation reference signal (DMRS), is generated as an OFDM symbol signal, and is transmitted through a corresponding antenna port.

A PUCCH carries Uplink Control Information (UCI). UCI includes:

SR (Scheduling Request): It is information used to request a UL-SCH resource.

Hybrid Automatic Repeat reQuest (HARQ)-ACK (Acknowledgment): It is a response to a downlink data packet (e.g., codeword) on the PDSCH. It indicates whether a downlink data packet has been successfully received. 1 bit of HARQ-ACK may be transmitted in response to a single codeword, and 2 bits of HARQ-ACK may be transmitted in response to two codewords. A HARQ-ACK response includes positive ACK (simply, ACK), negative ACK (NACK), DTX or NACK/DTX. Here, HARQ-ACK includes HARQ ACK/NACK and ACK/NACK.

CSI (Channel State Information): It is feedback information for a downlink channel. Multiple Input Multiple Output (MIMO)-related feedback information includes a Rank Indicator (RI) and a Precoding Matrix Indicator (PMI).

Table 5 illustrates PUCCH formats. According to the PUCCH transmission length, it can be divided into Short PUCCH (formats 0, 2) and Long PUCCH (formats 1, 3, 4).

TABLE 5

| PUCCH format | Length in OFDM symbols | Number of bits | Usage | Etc |
| --- | --- | --- | --- | --- |
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 carries UCI having a maximum size of 2 bits, and is mapped based on a sequence and transmitted. Specifically, a UE transmits specific UCI to a base station by transmitting one of a plurality of sequences through a PUCCH with PUCCH format 0. A UE transmits a PUCCH with PUCCH format 0 in a PUCCH resource for configuring a corresponding SR only when transmitting a positive SR.

PUCCH format 1 carries UCI having a maximum size of 2 bits, and a modulation symbol is spread by an orthogonal cover code (OCC) (which is configured differently according to whether or not frequency hopping is performed) in a time domain. A DMRS is transmitted in a symbol in which a modulation symbol is not transmitted (that is, time division multiplexing (TDM) is performed and transmitted).

PUCCH format 2 carries UCI having a bit size greater than 2 bits, and a modulation symbol is transmitted by frequency division multiplexing (FDM) with a DMRS. A DM-RS is located at symbol indexes #1, #4, #7, and #10 in a given resource block with a density of ⅓. A Pseudo Noise (PN) sequence is used for a DM_RS sequence. For 2-symbol PUCCH format 2, frequency hopping may be activated.

In PUCCH format 3, UE multiplexing is not performed in the same physical resource blocks, and the PUCCH format 3 carrier UCI having a bit size greater than 2 bits. In other words, a PUCCH resource of PUCCH format 3 does not include an orthogonal cover code. A modulation symbol is transmitted by time division multiplexing (TDM) with a DMRS.

PUCCH format 4 supports multiplexing up to 4 UEs in the same physical resource blocks, and carries UCI having a bit size greater than 2 bits. In other words, a PUCCH resource of PUCCH format 3 includes an orthogonal cover code. The modulation symbol is transmitted by time division multiplexing (TDM) with a DMRS.

A PUSCH carries uplink data (e.g., UL-SCH transport block, UL-SCH TB) and/or uplink control information (UCI), and is transmitted based on a CP-OFDM (Cyclic Prefix-Orthogonal Frequency Division Multiplexing) waveform or a DFT-s-OFDM (Discrete Fourier Transform-spread-Orthogonal Frequency Division Multiplexing) waveform. When a PUSCH is transmitted based on a DFT-s-OFDM waveform, a UE transmits a PUSCH by applying transform precoding. For example, when transform precoding is not possible (e.g., transform precoding is disabled), a UE transmits a PUSCH based on a CP-OFDM waveform, and when transform precoding is possible (e.g., transform precoding is enabled), a UE transmits a PUSCH based on a CP-OFDM waveform or a DFT-s-OFDM waveform. PUSCH transmission may be dynamically scheduled by a UL grant in DCI, or scheduled based on higher layer (e.g., RRC) signaling (and/or Layer 1 (L1) signaling (e.g., PDCCH)) semi-statically (configured grant). PUSCH transmission may be performed on a codebook-based transmission or a non-codebook-based transmission.

Figure 6:
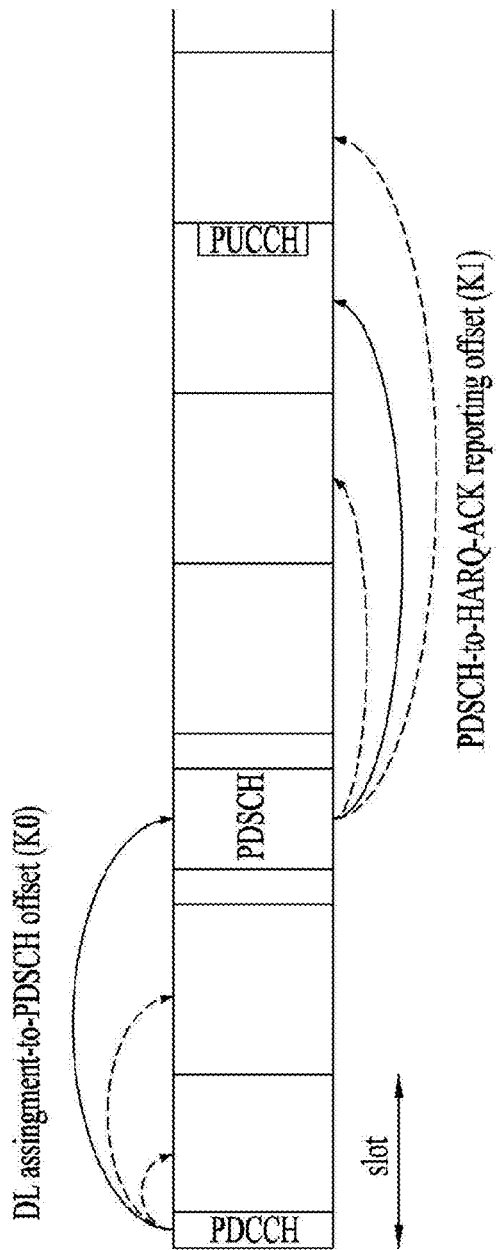
FIG. 6 illustrates the ACK/NACK transmission process.

FIG. 6 illustrates the ACK/NACK transmission process. Referring to FIG. 6, a UE may detect a PDCCH in slot #n. Here, a PDCCH includes downlink scheduling information (e.g., DCI formats 1_0 and 1_1), and the PDCCH indicates a DL assignment-to-PDSCH offset (K0) and a PDSCH-HARQ-ACK reporting offset (K1). For example, DCI formats 1_0 and 1_1 may include the following information.

Frequency domain resource assignment: indicates a RB set allocated to a PDSCH

Time domain resource assignment: K0, indicates a starting position (e.g., OFDM symbol index) and a length (e.g., number of OFDM symbols) of a PDSCH in a slot PDSCH-to-HARQ_feedback timing indicator: indicates K1

HARQ process number (4 bits): indicates a HARQ process ID (Identity) for data (e.g., PDSCH, TB)

Thereafter, a UE may receive a PDSCH in a slot #(n+K0) according to scheduling information of slot #n, and then transmit UCI through PUCCH in a slot #(n+K1). Here, UCI includes a HARQ-ACK response for a PDSCH. If a PDSCH is configured to transmit up to 1 TB, a HARQ-ACK response may be configured with 1-bit. When a PDSCH is configured to transmit up to 2 TBs, a HARQ-ACK response may be configured with 2-bits when spatial bundling is not configured, and may be configured with 1-bits when spatial bundling is configured. When the HARQ-ACK transmission time for a plurality of PDSCHs is designated as a slot #(n+K1), UCI transmitted in a slot #(n+K1) includes HARQ-ACK responses for the plurality of PDSCHs.

A plurality of parallel DL HARQ processes exist for DL transmission in a base station/UE. A plurality of parallel HARQ processes allow DL transmissions to be performed continuously while waiting for HARQ feedback on successful or unsuccessful reception of previous DL transmission. Each HARQ process is associated with a HARQ buffer of a MAC (Medium Access Control) layer. Each DL HARQ process manages state variables related to the number of transmissions of a MAC PDU (Physical Data Block) in a buffer, HARQ feedback for a MAC PDU in a buffer, and a current redundancy version, etc. Each HARQ process is identified by a HARQ process ID.

Figure 7:
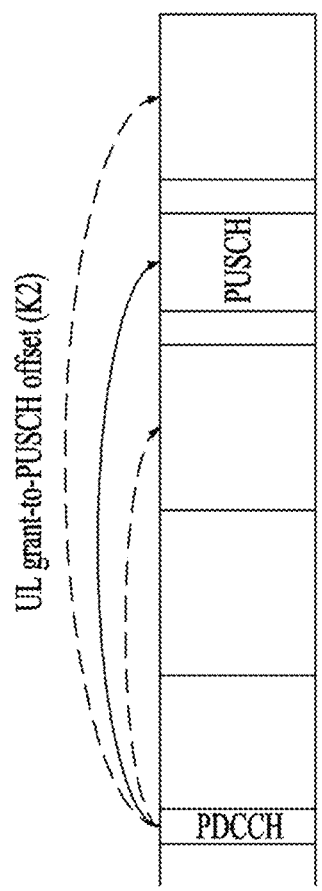
FIG. 7 illustrates a PUSCH (Physical Uplink Shared Channel) transmission process.

FIG. 7 illustrates a PUSCH (Physical Uplink Shared Channel) transmission process. Referring to FIG. 7, a UE may detect a PDCCH in a slot #n. Here, a PDCCH includes uplink scheduling information (e.g., DCI formats 0_0, 0_1). DCI formats 0_0 and 0_1 may include the following information.

Frequency domain resource assignment: indicates a set of RBs allocated to a PUSCH Time domain resource assignment: indicates a slot offset K2, a starting position (e.g., symbol index) and a length (e.g., number of OFDM symbols) of a PUSCH in a slot. A start symbol and a length may be indicated through a Start and Length Indicator Value (SLIV) or may be indicated respectively.

Thereafter, a UE may transmit a PUSCH in a slot #(n+K2) according to scheduling information of a slot #n. Here, PUSCH includes UL-SCH TB.

Figure 8:
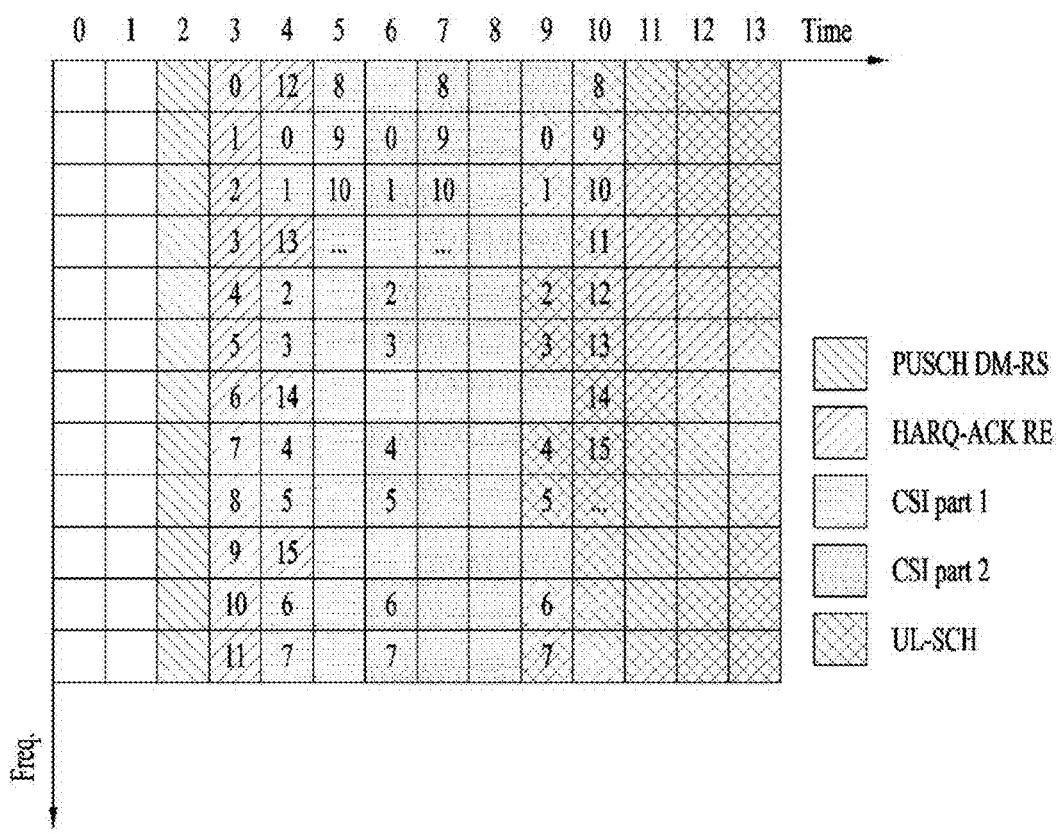
FIG. 8 illustrates an example of multiplexing control information to PUSCH.

FIG. 8 illustrates an example of multiplexing UCI to PUSCH. When a plurality of PUCCH resources and PUSCH resources overlap within a slot and simultaneous PUCCH-PUSCH transmission is not configured, UCI may be transmitted through PUSCH as shown (UCI piggyback or PUSCH piggyback). FIG. 8 illustrates a case in which HARQ-ACK and CSI are carried on a PUSCH resource.

Figure 9A:
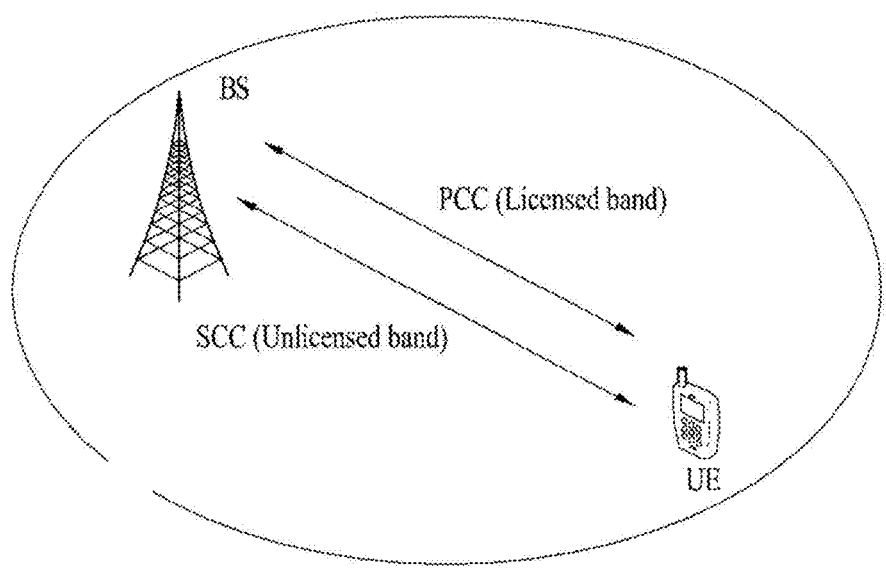
FIGS. 9A and 9B illustrate a wireless communication system supporting an unlicensed band.
Figure 9B:
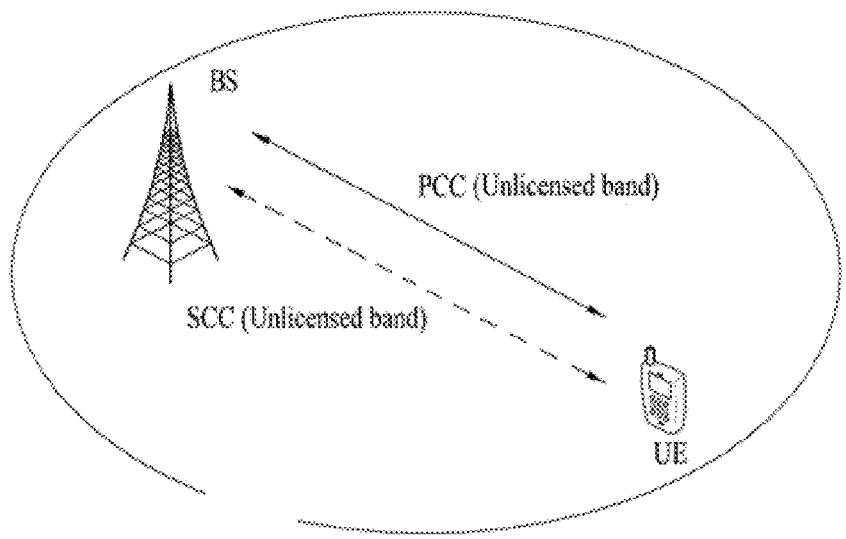

FIGS. 9A and 9B illustrate a wireless communication system supporting an unlicensed band. For convenience, a cell operating in a licensed band (hereinafter, L-band) is defined as an LCell, and a carrier of the LCell is defined as a (DL/UL) Licensed Component Carrier (LCC). In addition, a cell operating in an unlicensed band (hereinafter, U-band) is defined as a UCell, and a carrier of the UCell is defined as an (DL/UL) Unlicensed Component Carrier (UCC). A carrier of a cell may mean an operating frequency (e.g., a center frequency) of the cell. A cell/carrier (e.g., Component Carrier, CC) may be referred to as a cell.

When carrier aggregation (CA) is supported, one UE may transmit/receive a signal to/from a base station through a plurality of aggregated cells/carriers. When a plurality of CCs are configured for one UE, one CC may be configured as a PCC (Primary CC), and the remaining CCs may be configured as SCCs (Secondary CC). Specific control information/channel (e.g., CSS PDCCH, PUCCH) may be configured to be transmitted/received only through a PCC. Data may be transmitted and received through a PCC/SCC. FIG. 9A illustrates a case in which a UE and a base station transmit and receive signals through an LCC and a UCC (non-standalone (NSA) mode). In this case, an LCC may be configured to a PCC and a UCC may be configured to a SCC. When a plurality of LCCs are configured in a UE, one specific LCC may be configured as a PCC and the remaining LCCs may be configured as SCCs. FIG. 9A corresponds to LAA of a 3GPP LTE system. FIG. 9B illustrates a case in which a UE and a base station transmit and receive signals through one or more UCCs without any LCC (standalone mode (SA)). In this case, one of the UCCs may be configured as a PCC and the other UCCs may be configured as SCCs. Accordingly, PUCCH, PUSCH, PRACH transmission, etc. may be supported in a NR UCell. In an unlicensed band of a 3GPP NR system, both an NSA mode and an SA mode may be supported.

Figure 10:
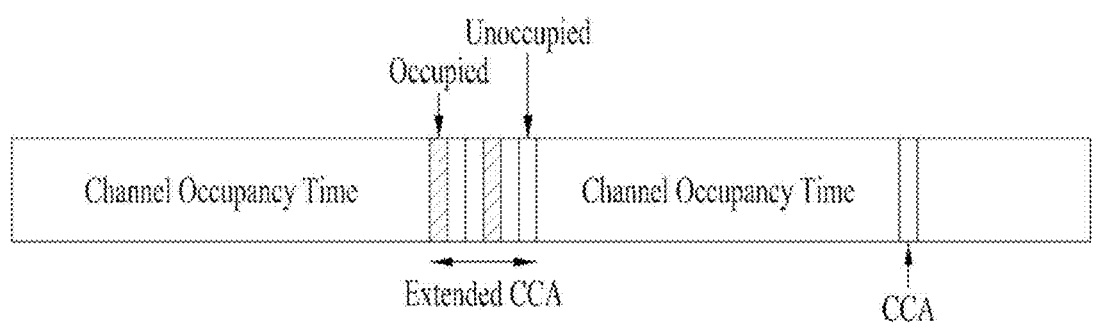
FIG. 10 illustrates a method for occupying a resource in an unlicensed band.

FIG. 10 illustrates a method for occupying a resource in an unlicensed band. According to regional regulations on unlicensed bands, communication nodes in unlicensed bands should determine whether other communication node(s) use channels before signal transmission. Specifically, a communication node may first perform CS (Carrier Sensing) before transmitting a signal to check whether other communication node(s) are transmitting a signal. A case in which it is determined that other communication node(s) does not transmit a signal is defined as CCA (Clear Channel Assessment) has been confirmed. If there is a pre-defined CCA threshold or a CCA threshold configured by higher layer (e.g., RRC) signaling, a communication node determines channel state as busy if energy higher than the CCA threshold is detected in a channel, otherwise channel state may be considered as idle. For reference, in the Wi-Fi standard (802.11ac), a CCA threshold is defined as −62 dBm for a non-Wi-Fi signal and −82 dBm for a Wi-Fi signal. If it is determined that channel state is idle, a communication node may start transmitting a signal in a UCell. The above-described series of procedures may be referred to as a Listen-Before-Talk (LBT) or a Channel Access Procedure (CAP). A LBT and a CAP may be equivalent.

In Europe, two LBT operations are exemplified as FBE (Frame Based Equipment) and LBE (Load Based Equipment). In FBE, a channel occupancy time (e.g., 1-10 ms), which means the time during which a communication node can continue to transmit when the communication node succeeds in accessing a channel, and an idle period corresponding to at least 5% of the channel occupancy time are included in one fixed frame, and CCA is defined as an operation of observing a channel during a CCA slot (at least 20 s) at the end of the idle period. A communication node periodically performs CCA in units of fixed frames, and when a channel is unoccupied, it transmits data during a channel occupied time, and when a channel is occupied, it waits until a CCA slot of a next cycle.

On the other hand, in the case of LBE, a communication node first configures a value of q∈{4, 5, . . . , 32}, and then performs CCA for one CCA slot. When a channel is unoccupied in a first CCA slot, data can be transmitted by securing time of maximum (13/32)q ms length. If a channel is occupied in a first CCA slot, a communication node randomly selects a value of N∈{1, 2, . . . , q} and stores it as an initial value of a counter, and then while sensing channel state in units of CCA slots, when a channel is unoccupied in units of CCA slots, the value stored in the counter is decremented by one. When the counter value becomes 0, a communication node may transmit data by securing a time of maximum (13/32)q ms length.

Specifically, a plurality of CAP Type (i.e., LBT Type) for uplink transmission in an unlicensed band may be defined. For example, a Type 1 or Type 2 CAP may be defined for uplink transmission. A UE may perform a CAP (e.g., Type 1 or Type 2) configured/indicated by a base station for uplink signal transmission.

(1) Type 1 Uplink CAP Method

Figure 11:
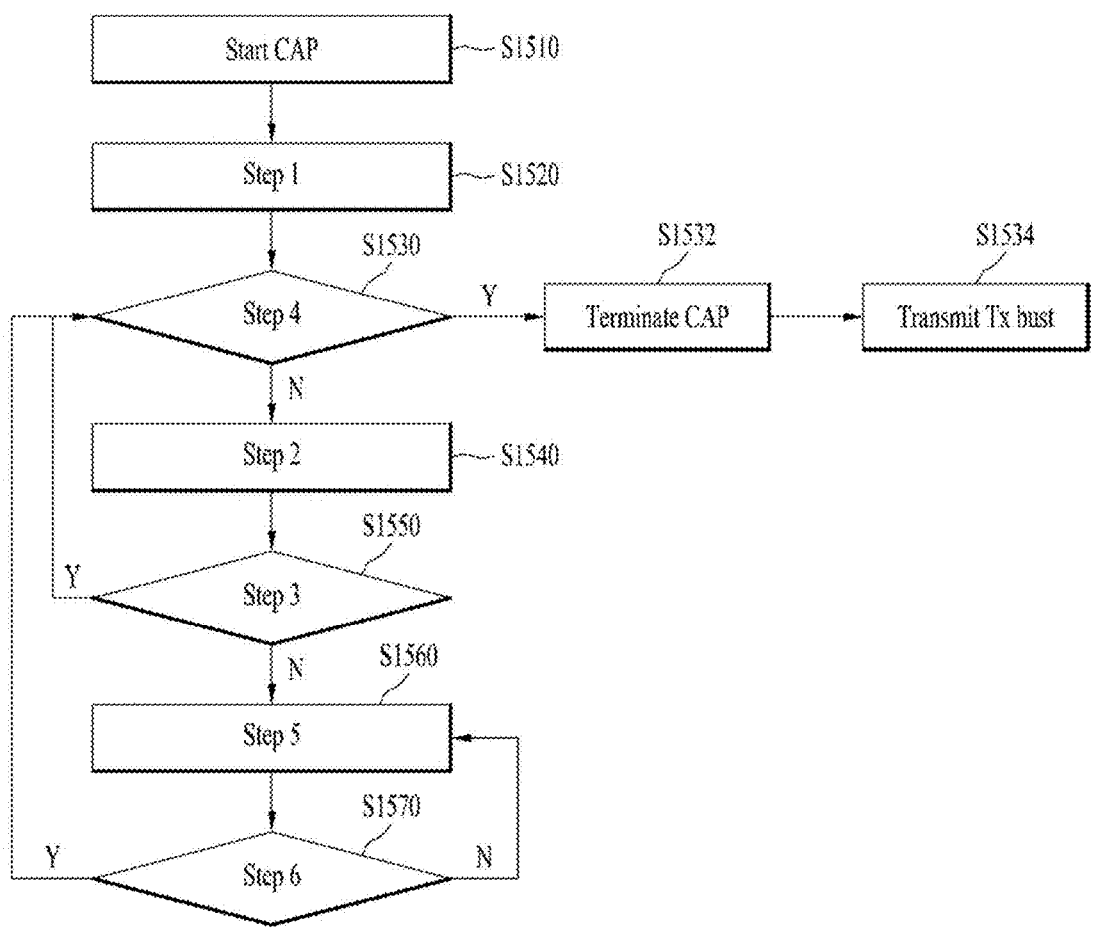
FIG. 11 illustrates a flow chart of Type 1 CAP operation of a user equipment for uplink signal transmission.

FIG. 11 illustrates a flow chart of Type 1 CAP operation of a UE for uplink signal transmission.

A UE may initiate a CAP for signal transmission through an unlicensed band (S1510). A UE may arbitrarily select a backoff counter N within a contention window (CW) according to step 1. Here, a value of N is configured to an initial value $N_{init}$ (S1520). $N_{init}$ is selected to be any value between 0 and $CW_p$. Then, according to step 4, if a backoff counter value (N) is 0 (S1530; Y), a UE ends a CAP process (S1532). Thereafter, a UE may perform Tx burst transmission (S1534). On the other hand, if a backoff counter value is not 0 (S1530; N), a UE decreases a backoff counter value by 1 according to step 2 (S1540). Thereafter, a UE checks whether a channel of a UCell(s) is in an idle state (S1550), and if a channel is in an idle state (S1550; Y), checks whether a backoff counter value is 0 (S1530). On the other hand, if a channel is not in an idle state in step S1550, that is, if a channel is in a busy state (S1550; N), a UE checks whether a corresponding channel is in an idle state for a delay period (defer duration Td; 25 usec or more) longer than a slot time (e.g., 9 us) according to step 5 (S1560). If a channel is in an idle state during a delay period (S1570; Y), a UE may resume a CAP process again. Here, a delay period may include a 16 usec period and $m_p$ consecutive slot times (e.g., 9 us) immediately following it. On the other hand, if a channel is in a busy state during a delay period (S1570; N), a UE re-performs step S1560 to check again whether a channel is in an idle state during a new delay period.

Table 6 shows $m_p$, minimum CW ($CW_{min,p}$), maximum CW ($CW_{max,p}$), maximum channel occupancy time (MCOT, $T_{ulmcot,p}$) applied to a CAP according to a channel access priority class (p).

TABLE 6

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

A CW size (CWS) applied to a Type 1 CAP may be determined based on various methods. As an example, a CWS may be adjusted based on whether to toggle a New Data Indicator (NDI) value for at least one HARQ processor related to HARQ_ID_ref, which is a HARQ process ID of a UL-SCH within a predetermined time duration (e.g., reference TU).

When a UE performs signal transmission using a Type 1 CAP related to a channel access priority class p on a carrier, if an NDI value for at least one HARQ process related to HARQ_ID_ref is toggled, the UE sets $CW_p=CW_{min,p}$ in all priority classes p∈{1,2,3,4}, and if not, the UE increases $CW_p$ to the next higher allowed value in all priority classes p∈{1,2,3,4}.

The reference subframe $n_{ref}$ (or reference slot $n_{ref}$) is determined as follows.

When a UE receives a UL grant in a subframe (or slot) $n_g$ and performs transmission including a UL-SCH without a gap starting from a subframe (or slot) no in subframes (or slots) $n_0, n_1, \ldots, n_w$, a reference subframe (or slot) $n_{ref}$ is a subframe (or slot) $n_0$.

(2) Type 2 Uplink CAP Method

If it is sensed that a channel is idle for at least a sensing period $T_{short\_ul}=25$ us, a UE may perform uplink transmission (e.g., PUSCH) in an unlicensed band immediately after the sensing is terminated. $T_{short\_ul}$ may include $T_{sl}$ (=9 us)+$T_f$(=16 us).

Embodiment: HARQ-ACK Feedback in U-Band

In order to support stand-alone operation in a U-band, for DL data (e.g., PDSCH) reception, HARQ-ACK feedback operation based on U-band PUCCH/PUSCH transmission of a UE may be essential (Hereinafter, HARQ-ACK is referred to as A/N for convenience). A PUCCH/PUSCH indicates a PUCCH or a PUSCH. For example, a process in which a base station schedules DL data transmission to a UE through a channel occupancy time (COT) duration secured by performing an LBT (CCA) operation and the base station indicates to transmit HARQ-ACK feedback for the corresponding DL data reception from the corresponding UE through the same COT duration may be considered (hereinafter, an LBT or a CCA is referred to as an LBT for convenience). As another example, due to a UE processing time involved in decoding of a DL data signal and encoding of a corresponding HARQ-ACK signal, for a reception of scheduled/transmitted DL data through a specific COT duration, a process of indicating to transmit HARQ-ACK feedback through another COT duration after the corresponding COT duration may be considered.

Hereinafter, in the present disclosure, a HARQ-ACK feedback (hereinafter, A/N) configuration/transmission method in a U-band is proposed. Here, the A/N configuration/transmission method may be performed in consideration of an LBT operation, a COT configuration, etc. The methods proposed in the present disclosure are not limited to the HARQ-ACK feedback transmission method through a PUCCH/PUSCH, and may be similarly applied to other UCI (e.g., CSI, SR) transmission methods through a PUCCH/PUSCH. In addition, the methods proposed in the present disclosure are not limited to LBT-based U-band operation, and may be similarly applied to L-band (or U-band) operation not accompanied by LBT. In addition, in the following description, a plurality of CCs (indexes) are replaced with a plurality of BWPs (indexes) configured in one (or more) CC/(serving) cells, or a plurality of CCs/(serving) cells including a plurality of BWPs (that is, a combination of CC (index) and BWP (index)).

First, terms are defined as follows.

UCI: means control information transmitted by a UE in UL. UCI includes several types of control information (i.e., UCI type). For example, UCI includes HARQ-ACK, SR, and CSI.

HARQ-ACK: indicates whether DL data (e.g., transport block (TB), codeword (CW)) on a PDSCH has been successfully received. 1 bit of HARQ-ACK may be transmitted in response to single DL data, and 2 bits of HARQ-ACK may be transmitted in response to two DL data. A HARQ-ACK response/result includes a positive ACK (ACK), a negative ACK (NACK), a DTX or a NACK/DTX. Here, a HARQ-ACK is equivalent to am ACK/NACK, an A/N, and an AN.

HARQ process number/ID: indicates the number or identifier of a HARQ process. A HARQ process manages state variables related to the number of transmissions of a MAC PDU in a buffer, HARQ feedback for a MAC PDU in a buffer, and a current redundancy version, etc.

PUCCH: means a physical layer UL channel for UCI transmission. For convenience, for A/N, SR, and CSI transmission, PUCCH resources configured and/or indicated for transmission by a base station are referred to as a A/N PUCCH resource, a SR PUCCH resource, and a CSI PUCCH resource, respectively.

PUSCH: means a physical layer UL channel for UL data transmission.

Slot: means a basic time unit (TU) (or time interval) for data scheduling. A slot includes a plurality of symbols. Here, a symbol includes an OFDM-based symbol (e.g., a CP-OFDM symbol, a DFT-s-OFDM symbol). In the present disclosure, a symbol, an OFDM-based symbol, an OFDM symbol, a CP-OFDM symbol, and a DFT-s-OFDM symbol may be substituted for each other.

Each of the proposed methods described below may be combined and applied together as long as they do not contradict each other.

(1) Basic Operation Method

Basic operation methods for the A/N feedback configuration/transmission method proposed in the present disclosure will be described as follows. In the present disclosure, A/N triggering DCI includes at least DL grant DCI, and (in addition to the DL grant DCI) may further include UL grant DCI and/or specific DCI that does not schedule PDSCH/PUSCH transmission.

1) Timing-Based A/N Feedback Method (Hereinafter, t-A/N Method) (FIGS. 12A and 12B)

A. After configuring a plurality of candidate HARQ timings through RRC signaling in advance, a base station may indicate to a UE one of the plurality of candidate HARQ timings through (DL grant) DCI. In this case, a UE may operate to transmit A/N feedback for (a plurality of) PDSCH reception through indicated the HARQ timing in a plurality of slots (or a slot set; for convenience, a bundling window) corresponding to an entire candidate HARQ timing set. Here, A HARQ timing means a PDSCH-to-A/N timing/interval. A HARQ timing may be expressed in units of slots.

For example, when A/N transmission is indicated in a slot #m, A/N information may include response information for PDSCH reception in a slot #(m−i). Here, a slot #(m−i) corresponds to a slot corresponding to candidate HARQ timings. FIG. 12A illustrates a case where candidate HARQ timings are configured to i={2, 3, 4, 5}. In this case, when the A/N transmission time is indicated as #(n+5)(=m), a UE may generate and transmit A/N information for PDSCH reception of slots #n~#(n+3)(=m−i) (i.e., A/N feedback for all 4 slots). Here, A/N responses to PDSCH reception of slots #n+1/#n+3 may be treated as NACKs.

For convenience, this A/N feedback configuration/transmission method is referred to as "Type-1 A/N codebook".

B. In addition to a HARQ timing indication, a counter Downlink Assignment Index (c-DAI) and/or a total-DAI (t-DAI) may be signaled together through (DL grant) DCI. A c-DAI may inform in which order a PDSCH corresponding to (DL grant) DCI is scheduled. A t-DAI may inform of the total number of PDSCHs (or the total number of slots in which PDSCHs exist) scheduled up to the present (slot). Accordingly, a UE may operate to transmit A/N for PDSCHs corresponding to a c-DAI values from an initial c-DAI value to (received) last t-DAI value through an indicated HARQ timing. When the number of serving cells configured for a UE is one, a c-DAI and a t-DAI may have the same meaning. Accordingly, a t-DAI may be included in (DL grant) DCI only when the number of serving cells is plural. When a plurality of serving cells are configured in a UE, a c-DAI is first counted in the cell-domain, and then the c-DAI may inform of a scheduling order of a PDSCH counted in a time-domain (or an order (of a serving cell, a slot) in which a PDSCH exists). Similarly, a t-DAI may inform of the total number of PDSCHs scheduled up to the present (slot) (or the total number of serving cells, slots in which PDSCHs exist). Here, a c-DAI/t-DAI may be defined based on a PDCCH. In this case, in the above description, the PDSCH may be replaced with a PDCCH, and the slot in which the PDCCH exists may be replaced with a PDCCH monitoring opportunity in which a PDCCH (or DCI) related to the PDCCH exists.

Each c-DAI/t-DAI may be indicated using a 2-bit value. A number greater than 4 can be indicated as follows using a modulo operation.

When a DAI bit is 00 (e.g., DAI value=1): indicates 4n+1 (i.e., 1, 5, 9, . . . )

When a DAI bit is 01 (e.g., DAI value=2): indicates 4n+2 (i.e., 2, 6, 10, . . . )

When a DAI bit is 10 (e.g., DAI value=3): indicates 4n+3 (i.e., 3, 7, 11, . . . )

When a DAI bit is 11 (e.g., DAI value=4): indicates 4n+4 (i.e., 4, 8, 12, . . . )

n represents an integer greater than or equal to 0.

FIG. 12B illustrates a case in which a DAI is signaled through (DL grant) DCI in the same situation as FIG. 12A. Referring to FIG. 12B, a PDSCH scheduled by DCI having DAI=00 in a slot #n may be received, and a PDSCH scheduled by DCI having DAI=10 in a slot #(n+2) may be received. In this case, a UE may generate/transmit A/N information only for reception of three PDSCHs corresponding to consecutive DAI values (i.e., DAI=00/01/11) (hereinafter, a DAI sequence). Here, an A/N response for reception of a PDSCH corresponding to DAI=01 may be processed as a NACK.

Figure 13:
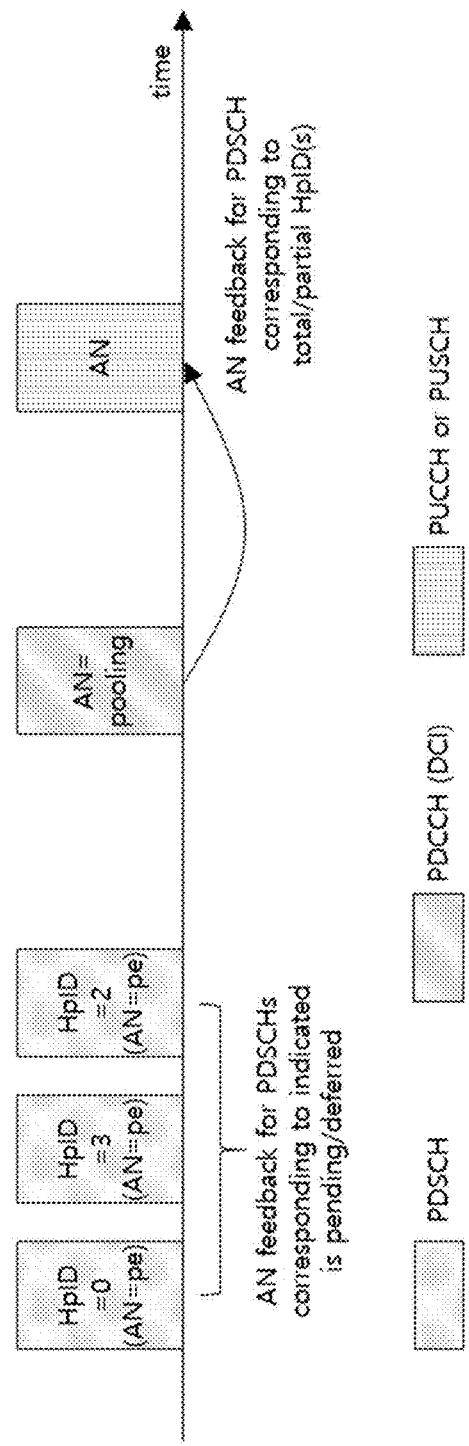

2) Pooling-Based A/N Feedback Method (Hereinafter, p-A/N Method) (FIG. 13)

A. An operation of delaying (pending/deferring) A/N feedback transmission for a corresponding PDSCH may be indicated through DL grant DCI. Thereafter, through DCI, transmission of A/N feedback for PDSCH(s) corresponding to (i) all DL HARQ process IDs, or (ii) specific partial DL HARQ process ID(s) may be indicated (pooling). A/N feedback may be transmitted through a timing configured/indicated based on a specific signal (e.g., RRC or DCI signaling). A/N pooling may be indicated through a DL grant (e.g., DCI format 1_0/1_1), a UL grant (e.g., DCI format 0_0/0_1) or other DCI (e.g., UE (group) common DCI). For convenience, DCI indicating A/N pooling is referred to as pooling DCI. A HARQ process ID to be pooled may be preconfigured/predefined or may be indicated through pooling DCI. A/N pooling may be indicated in units of whole/group/individual HARQ process IDs.

For example, referring to FIG. 13, a UE may receive three PDSCHs from a base station, and HARQ process IDs (HpIDs) assigned to each PDSCH may be 0, 3, and 2. In addition, A/N pending (AN=pe) may be indicated for three PDSCHs through each DL grant DCI. In this case, a UE delays A/N transmission for PDSCHs reception corresponding to HpID=0/3/2. Thereafter, upon receiving a pooling DCI (AN=pooling) from a base station, a UE may transmit A/N for PDSCHs reception corresponding to all or some HpIDs at a time.

B. When c-/t-DAI signaling is configured in t-A/N method (e.g., when a DAI is signaled through DL grant DCI), A/N pooling corresponds to a HARQ process ID (indicated through pooling DCI) may be defined as pulling A/N transmission for a PDSCH corresponding to a HARQ process ID or pulling A/N transmission for a PDSCH corresponding to a t-DAI value (indicated through pooling DCI). In the latter case, a UE may transmit A/N information for PDSCHs reception corresponding to a c-DAI initial value to a t-DAI value at a time.

(2) Proposed Method 1

In the case of proposed method 1, through A/N triggering DCI, 1) timing-A indicating an actual A/N transmission timing, and 2) timing-D indicating a reference A/N timing corresponding to a (DL PDSCH) slot group that is an A/N feedback target may be signaled.

Based on this, a UE may operate to transmit A/N feedback for a slot group (PDSCH reception through the slot group) corresponding to timing-D through the time indicated by timing-A. In this case, a A/N payload may be mapped (e.g., ordered) in a slot index order belonging to a corresponding slot group.

For example, A/N triggering DCI (or, if A/N triggering DCI is a DL grant DCI, a corresponding PDSCH) is transmitted/detected through a slot #n, and timing-A=K and timing-D=L through a corresponding DCI may be indicated. In this case, a UE may operate to transmit A/N feedback for a slot group (i.e., PDSCH reception through the slot group) corresponding to a slot #(n+K−L) through a slot #(n+K). Here, a slot group may be defined as a timing set including a plurality (e.g., M) of candidate timing values D_m (m=0, 1, ... , M−1). For example, a slot group corresponding to a slot #n may be configured/defined as M slots corresponding to slots #(n−D_m) or slots #(n+D_m) (m=0, 1, ... , M−1). In this case, a slot group corresponding to a slot #(n+K−L) may be configured/defined as slots #(n+K−L−Dm) or slots #(n+K−L+D_m) (m=0, 1, ... , M−1).

On the other hand, a timing set defining a slot group may be configured to be the same as a set of candidate timing-A values (e.g., K_m; m=0, 1, ... , M−1) that can be indicated by timing-A, or may be configured independently (differently). For example, a bundling window corresponding to a slot #n may be configured as slots #(n−K_m), and a slot group corresponding to a slot #n may be also defined by a timing set configured with K_m (m=0, 1, ... , M−1). For example, A/N triggering DCI (or, when A/N triggering DCI is DL grant DCI, a corresponding PDSCH) may be transmitted/detected through a slot #n, and timing-A=K and timing-D=L may be indicated through the corresponding DCI. In this case, a UE may operate to transmit A/N feedback for a slot group (PDSCH reception through the slot group) corresponding to a slot #(n+K−L) through a slot #(n+K). Here, a slot group corresponding to a slot #(n+K−L) may be configured with slots #(n+K−(K_m+L)) (m=0, 1, ... , M−1).

On the other hand, when A/N triggering DCI is the same as DL grant DCI (that is, both timing-A and timing-D are signaled through DL grant DCI), a UE may operate to transmit (at the same time, for example, through one PUCCH/PUSCH) by combining 1) A/N feedback for a bundling window (PDSCH reception through the bundling window) corresponding to timing-A and 2) A/N feedback for a slot group (PDSCH reception through the slot group) corresponding to timing-D, through the time indicated by timing-A.

For example, when DL grant DCI or a corresponding PDSCH is transmitted/detected through a slot #n and timing-A=K and timing-D=L are indicated through a corresponding DCI, a UE may operate to transmit by combining 1) A/N feedback for a bundling window (PDSCH reception through the bundling window) corresponding to a slot #(n+K) and 2) A/N feedback for a slot group (PDSCH reception through the slot group) corresponding to a slot #(n+K−L), through a slot #(n+K). Here, a slot group corresponding to a slot #(n+K−L) may be configured/defined as (i) slots #(n+K−L−Dm) or slots #(n+K−L+D_m) (m=0, 1, ... , M−1), or (ii) slots #(n+K−(K_m+L)) (m=0, 1, ... , M−1).

Additionally, (e.g., when A/N triggering DCI is the same as DL grant DCI) it may be indicated through DCI that there is no timing-D and/or a slot group corresponding thereto (A/N feedback request for this). For example, when timing-D=a specific value (e.g., 0) is configured, it may indicate that there is no corresponding slot group (A/N feedback request for this).

Additionally, (e.g., when A/N triggering DCI is the same as DL grant DCI) it may be indicated through DCI (e.g., through a timing-D indication field) that A/N feedback is transmitted only for a specific part (e.g., first or last slot) among slots belonging to a bundling window (or a slot group corresponding to timing-D) corresponding to timing-A.

As another method, a method of signaling A/N feedback transmission triggering for timing-A/timing-D and a corresponding slot group (e.g., bundling window) corresponding thereto, through UE (group)-common DCI may also be considered.

Meanwhile, due to a limited DCI field size/number of bits, a reference A/N timing (corresponding A/N feedback target slot group) that can be indicated by timing-D may be limited. In consideration of this, it may be indicated that A/N feedback for PDSCH reception corresponding to all (not a specific slot group) or some (pre-specified) specific HARQ process IDs is transmitted, through a specific state of a timing-D indication field.

Meanwhile, A/N transmission PUCCH/PUSCH resources (sets) may be configured differently for each timing-D value. For example, A/N transmission PUCCH/PUSCH resources (sets) may be configured differently for each slot group corresponding to each timing-D value. In addition, a corresponding timing-D value (for example, corresponding to a A/N feedback target slot group to a corresponding PUCCH/PUSCH resource (set)) for each A/N transmission PUCCH/PUSCH resource (set) may be configured differently. For example, a slot group corresponding to each PUCCH/PUSCH resource (set) may be configured differently, and accordingly, a timing-D value may be configured differently.

(3) Proposed Method 2

In the case of proposed method 2, in a situation where one slot group size (e.g., the number N of slots in a single slot group or the maximum number N of schedulable PDSCHs in a single slot group) is preconfigured in advance, 1) a current-ID (c-ID) indicating a slot group ID to which a slot in which a corresponding DCI or a corresponding PDSCH is transmitted belongs may be signaled through DL grant DCI, and 2) a feedback-ID (f-ID) indicating a slot group ID to be an A/N feedback target (DL PDSCH) may be signaled through A/N triggering DCI.

Based on this, a UE may transmit A/N feedback for a slot group (PDSCH reception through the slot group) corresponding to a feedback-ID through the time (e.g., slot) indicated as a A/N transmission timing. Here, a slot group corresponding to a feedback-ID includes a slot in which a current-ID of the same value as a previous feedback-ID is signaled/received, that is, a slot in which a current-ID having the same value as a feedback-ID is signaled/received through DL grant DCI.

Here, for an A/N payload for a slot group corresponding to a feedback-ID (in a situation where a counter-DAI is configured to be signaled through DL grant DCI), it may be mapped (ordered) in an order of counter-DAI values (e.g., from 1 to N) received through DL grant DCI.

Figure 14:
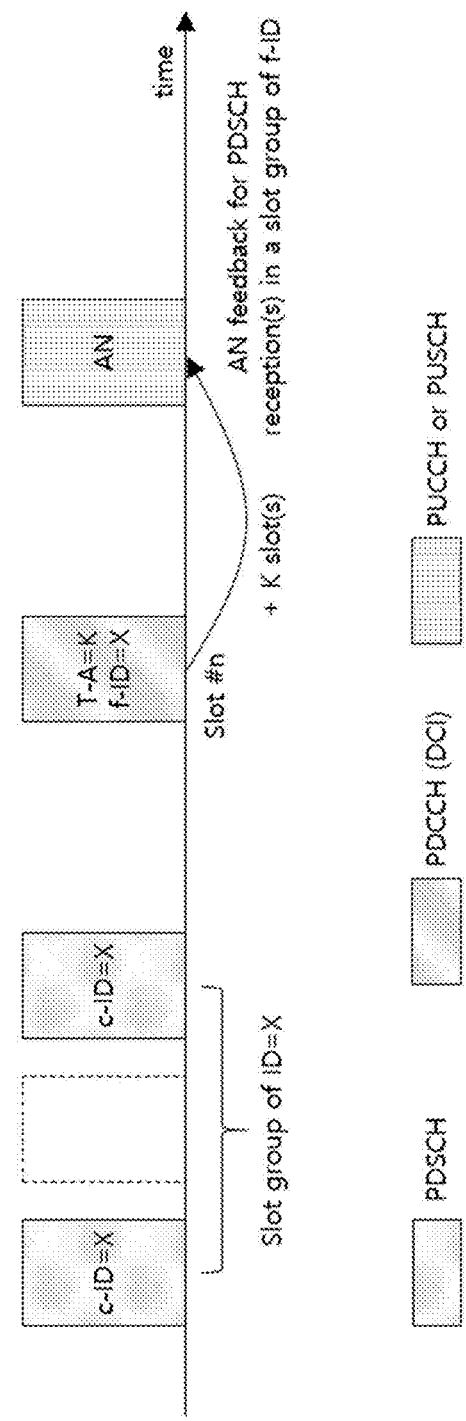

For example, referring to FIG. 14, A/N triggering DCI (or, when A/N triggering DCI is DL grant DCI, a corresponding PDSCH) may be transmitted/detected through a slot #n, timing-A (T-A)=K and feedback-ID (f-ID)=X may be indicated through a corresponding DCI. In this case, a UE may transmit A/N feedback for PDSCH reception in a slot group (i.e. received as current-ID (c-ID)=X through DL grant DCI) corresponding to slot group ID=X in a slot #(n+K).

Meanwhile, a counter-DAI may be determined/signaled to have a continuous value (starting from an initial value (e.g., 1)) in one slot group (ID) as shown in FIG. 12B. That is, a counter-DAI value may be independently determined/signaled between different slot groups. In addition, a slot group (indicated through DCI) may be defined in a form of a DAI sequence including counter-DAI values from 1 to N corresponding to the same slot group ID value. In this case, a slot group may be configured as discontinuous slots based on a received/detected counter-DAI. In the present disclosure, a slot group ID and a DAI sequence ID may be replaced/compatible with each other.

On the other hand, when A/N triggering DCI is the same as DL grant DCI (that is, both a current-ID and a feedback-ID are signaled through DL grant DCI), a UE may operate to transmit (simultaneously, for example, through one PUCCH/PUSCH) by combining (e.g., concatenate) 1) A/N feedback for a bundling window corresponding to timing-A or a slot group (PDSCH reception through the slot group) corresponding to a current-ID and 2) A/N feedback for a slot group (PDSCH reception through the slot group) corresponding to a feedback-ID, through the time indicated by timing-A.

Meanwhile, in the present disclosure, that a feedback-ID is signaled/indicated through A/N triggering DCI (e.g., DL grant DCI, UL grant DCI) may mean that a total-ID indicating the total number of (PDSCH) slot groups (IDs) targeted for A/N feedback transmission/request is signaled through a corresponding DCI, and a specific slot group ID determined from a total-ID and a current-ID is applied as a feedback-ID. For example, in a situation where up to two (PDSCH) slot group IDs (e.g., ID=0 or ID=1) are set/configured, when a current-ID is indicated as X and a total-ID is indicated as 1, a feedback-ID may be determined/applied to X (which is the same value as a current-ID). As another example, in a situation where up to two (PDSCH) slot group IDs (e.g., ID=0 or ID=1) are set/configured, a current-ID is indicated as X and a total-ID is indicated as 2, a feedback-ID may be determined/applied to Y (which is a different value from a current-ID). In this case, X and Y may be determined to be different values (e.g., Y=1 if X=0, or Y=0 if X=1). This method of determining a feedback-ID is referred to as "Method 1" for convenience.

For example, DL grant DCI or a corresponding PDSCH is transmitted/detected through a slot #n, and timing-A=K, current-ID=X, and feedback-ID=Y (or total-ID=2) may be indicated. In this case, a UE may transmit by combining 1) A/N feedback for a bundling window corresponding to a slot #(n+K) or a slot group (PDSCH reception through the slot group) corresponding to ID=X and 2) A/N feedback for a slot group (PDSCH reception through the slot group) corresponding to ID=Y, through a slot #(n+K).

On the other hand, in the present disclosure, a total-DAI and/or a NFI (New Feedback Indicator) for a feedback-ID (corresponding (PDSCH) slot group thereto) signaled/indicated through A/N triggering DCI (e.g., DL grant DCI, UL grant DCI) may means a total-DAI and/or a NFI for a feedback-ID determined according to Method 1, or a total-DAI and/or a NFI for an other-ID (a slot group corresponding thereto) having a value different from a current-ID (regardless of a value indicated as a total-ID). As an example of the latter, in a situation where up to two (PDSCH) slot group IDs (e.g., ID=0 or ID=1) are set/configured, when current-ID=X is indicated, "total-DAI and/or NFI for feedback-ID" may mean a total-DAI and/or a NFI for a slot group corresponding to other-ID=Y In this case, X and Y may be determined to be different values (e.g., Y=1 if X=0, or Y=0 if X=1). This method of determining an other-ID and applying total-DAI/NFI is referred to as "Method 2" for convenience.

Here, a NFI is 1-bit information, for A/N feedback (hereinafter, previous A/N feedback) transmitted at the previous (e.g., recent) time, (a) whether a base station has properly detected/received it, (b) whether a base station has failed to detect/receive it may be signaled. In the case of (a), a UE may process the remaining parts except for A/N corresponding to a PDSCH scheduled after previous A/N transmission as NACK or DTX (feedback configuration/transmission omitted) to configure/transmit the updated A/N feedback. In the case of (b), a UE may configure/transmit A/N feedback by maintaining the remaining parts except for A/N corresponding to a PDSCH scheduled after previous A/N transmission. In case of (a), an NFI value toggled from an NFI value received through previous DCI is indicated through current DCI. In case (b), an NFI value that is not toggled from an NFI value received through previous DCI may be indicated through current DCI.

For example, DL grant DCI or a corresponding PDSCH is transmitted/detected through a slot #n, and timing-A=K, current-ID=X and feedback-ID=Y (or, total-ID value=2) respectively indicated through a corresponding DCI, a UE may operate to transmit by combining 1) A/N feedback for a bundling window corresponding to a slot #(n+K) or a slot group (PDSCH reception through the slot group) corresponding to ID=X and 2) A/N feedback for a slot group (PDSCH reception through the slot group) corresponding to ID=Y, through a slot #(n+K).

Additionally, (e.g., when A/N triggering DCI is the same as DL grant DCI) it may be indicated (through a feedback-ID (or a total-ID) indication field) through DCI that there is no feedback-ID (or other-ID) and/or slot group (A/N feedback request on the slot group) corresponding thereto. For example, when a feedback-ID is indicated with the same value as a current-ID (or a total-ID value is 1), a UE may operate to configure/transmit A/N feedback only for (one) slot group corresponding to the current-ID.

Additionally, (e.g., when A/N triggering DCI is the same as DL grant DCI) A/N feedback is transmitted only for a specific part (e.g., the first or last slot) among slots belonging to a bundling window corresponding to a timing-A or a slot group (or a slot group corresponding to a feedback-ID (or an other-ID)) corresponding to a current-ID may be indicated through DCI (e.g., through a feedback-ID (or total-ID) indication field).

As another method, a method of signaling a current-ID through UE (group)-common DCI #1 and/or signaling A/N feedback transmission triggering for a feedback-ID and a slot group corresponding thereto through a UE (group)-common DCI #2 may be considered. In this case, UE (group)-common DCI #1 and #2 may be separate DCIs or may be configured as the same DCI.

In another method, a total-DAI is signaled through A/N triggering DCI, a UE may operate to configure/transmit A/N feedback only for counter-DAI value(s) from (1 to) to a total-DAI value for a slot group (or a bundling window corresponding to a timing-A or a slot group corresponding to a current-ID) corresponding to a feedback-ID. That is, A/N feedback may be configured/transmitted only for slot(s) (PDSCHs scheduled through this) corresponding to counter-DAI value(s) from 1 to a total-DAI value. Alternatively, total-DAIs for a slot group corresponding to a feedback-ID (or an other-ID) and for a slot group corresponding to a current-ID (or a bundling window corresponding to a timing-A) may be signaled through DCI, respectively. In this case, a UE may operate to configure/transmit A/N feedback based on a total-DAI for each slot group.

As an example, A/N feedback configuration related information indicated through DL grant DCI may include (i) a current-ID, (ii) a counter/total-DAI for a slot group corresponding to a current-ID (PDSCHs scheduled through this), and (iii) a feedback-ID (or a total-ID). In addition, a total-DAI for a slot group (PDSCHs scheduled through this) corresponding to a feedback-ID (or an other-ID) may be further included in DL grant DCI (i.e., A/N feedback configuration related information).

On the other hand, (i) a current-ID, (ii) a total-DAI for a slot group (PDSCHs scheduled through this) corresponding to a current-ID, (iii) a feedback-ID (or a total-ID), (iv) a total-DAI for a slot group corresponding to the feedback-ID (or an other-ID) may be indicated through UL grant DCI. Here, a current-ID and a feedback-ID may be defined/generalized as two feedback-IDs #1 and #2. Accordingly, a UE may operate to transmit A/N feedback for a slot group corresponding to feedback-IDs #1 and #2 through (PUCCH or) PUSCH (e.g., in a form of UCI piggyback).

Alternatively, a current-ID (and/or a feedback-ID (or a total-ID)) may not be included in UL grant DCI. That is, signaling through UL grant DCI may be omitted for a current-ID (and/or a feedback-ID (or a total-ID)). In this case, a UE may operate to configure/transmit A/N feedback (on PUSCH) based on current-ID (and/or feedback-ID (or total-ID)) information received through DL grant DCI. Additionally, it may be indicated through a specific field that there is no A/N feedback transmission request (e.g., a slot group targeted for A/N feedback) through UL grant DCI. Here, a specific field may include, for example, a feedback-ID (or a total-ID) and/or a current-ID (and/or a feedback-ID (or an other-ID) and/or a total-DAI corresponding to a current-ID) indication fields.

As another method, a current-ID and a starting-ID may be indicated through A/N triggering DCI (e.g., DL grant DCI, UL grant DCI). In this case, a UE may operate to configure/transmit A/N feedback for a slot group set A (PDSCH reception through it) corresponding to (plural) consecutive slot group ID(s) from a starting-ID to a current-ID. When a starting-ID is indicated with the same value as a current-ID, a UE may operate to configure/transmit A/N feedback only for (one) slot group corresponding to a current-ID. Here, a current-ID may be defined/generalized as an ending-ID.

As an example, A/N feedback configuration related information indicated through DL grant DCI may include at least (i) a current-ID, (ii) a slot group (PDSCHs scheduled through this) corresponding to a current-ID, (iii) a starting-ID. In addition, a (single) total-DAI commonly applied to each (plural) slot group(s) belonging to a slot group set A (excluding a slot group corresponding to a current-ID) may be further included in DL grant DCI (i.e., A/N Feedback configuration related information).

As another example, through UL grant DCI, (i) a current-ID, (ii) a total-DAI for a slot group (PDSCHs scheduled through this) corresponding to a current-ID, (iii) a starting-ID, (iv) a (single) total-DAI commonly applied to each (plural) slot group(s) belonging to a slot group set A (excluding a slot group corresponding to a current-ID) may be indicated. Accordingly, a UE may operate to transmit A/N feedback for a slot group set corresponding to a starting-ID to a current-ID through (PUCCH or) PUSCH (e.g., in a form of UCI piggyback).

As another example, a current-ID (and/or a starting-ID) may not be included in UL grant DCI. That is, signaling for a current-ID (and/or a starting-ID) through UL grant DCI may be omitted. In this case, a UE may operate to configure/transmit A/N feedback (on PUSCH) based on current-ID (and/or starting-ID) information received through DL grant DCI. Additionally, it may be indicated through a specific field that there is no A/N feedback transmission request (e.g., a slot group targeted for A/N feedback) through UL grant DCI. Here, a specific field may include, for example, a starting-ID and/or a current-ID (and/or a corresponding total-DAI) indication fields.

On the other hand, when the above-described method or other methods are applied, the number of simultaneously transmitted (single) A/N feedback configuration target slot groups may be dynamically changed (e.g., 2 including a current-ID, or 3 or more including a current-ID). In this case, through A/N triggering DCI (e.g., DL grant DCI) and/or UL grant DCI, a (single) total-DAI that is commonly applied to each of a plurality of slot groups (excluding a slot group corresponding to a current-ID) targeted for A/N feedback configuration may be indicated.

On the other hand, due to a limited DCI field size/number of bits, there may be a limit to a slot group ID (corresponding A/N feedback target slot group) that can be indicated by a current-ID/feedback-ID (or total-ID). In consideration of this, through a specific state of a current-ID/feedback-ID (or total-ID) indication field, it is indicated to transmit A/N feedback for PDSCH reception corresponding to all (not a specific slot group) or some (pre-specified) specific HARQ process IDs.

On the other hand, for each slot group ID value (for a slot group corresponding to a corresponding ID), a A/N transmission PUCCH/PUSCH resource (set) may be configured differently, or a slot group ID value corresponding to each A/N transmission PUCCH/PUSCH resource (set) (e.g., A/N feedback target to a corresponding PUCCH/PUSCH resource (set)) may be configured differently. For example, with respect to A/N feedback for slot group ID=X, a UE may operate to transmit by selecting/using a PUCCH/PUSCH resource (set) configured in slot group ID=X.

Additionally, in a situation in which a plurality of carriers are aggregated/configured to one UE (i.e., CA situation), for a slot group ID, Opt 1-1) the same slot group ID may be indicated/specified in common for all multiple carriers at the same time (e.g., slot timing) or time duration, or Opt 1-2) a slot group ID may be individually indicated/specified for each carrier in an order of frequency (carrier)-first time (slot group)-second (second).

Additionally, in a situation where a slot group ID is indicated/specified in a CA situation, for a counter-DAI, 1) (in a situation in which Opt 1-1 is applied) a PDSCH scheduling counter value may be determined/indicated in an order of frequency (carrier)-first time (slot)-second in one slot group (ID), or 2) (in a situation in which Opt 1-2 is applied) a PDSCH scheduling counter value may be independently determined/indicated in one slot group (ID) for each carrier.

(4) Proposed Method 3

Prior to the description of the proposed method, A/N feedback configuration/transmission and related basic operation methods will be described as follows. The tA/N method and the pA/N method are substantially the same as those described with reference to FIGS. 12A-13, and are described again below to classify the A/N feedback configuration/transmission methods (or A/N codebook method).

1) Timing-Based A/N Feedback Method (t-A/N Method)

A. After configuring a plurality of candidate HARQ timings through RRC signaling in advance, a base station may indicate to a UE one of a plurality of candidate HARQ timings through (DL grant) DCI. In this case, a UE may operate to transmit A/N feedback for (plural) PDSCH reception in a plurality of slots (or a slot set; a bundling window) corresponding to an entire candidate HARQ timing set through an indicated HARQ timing. Here, HARQ timing means PDSCH-to-A/N timing/interval. HARQ timing may be expressed in units of slots. Hereinafter, the above-described method is referred to as a Type-1 A/N codebook.

B. In addition to a HARQ timing indication, a counter Downlink Assignment Index (c-DAI) and/or a total-DAI (t-DAI) may be signaled together through (DL grant) DCI. A c-DAI may inform in which order a PDSCH corresponding to (DL grant) DCI is scheduled. A t-DAI may inform of the total number of PDSCHs (or the total number of slots in which PDSCHs exist) scheduled up to the present (slot). Accordingly, a UE may operate to transmit A/N for PDSCHs corresponding to a c-DAI values from an initial c-DAI value to (received) last t-DAI value through an indicated HARQ timing. Hereinafter, the above-described method is referred to as a Type-2 A/N codebook.

C. PDSCH (slot) group ID-based A/N feedback method (hereinafter, Type-2a A/N codebook)

i. A Current-ID may be signaled through DL grant DCI, and a feedback-ID may be signaled through A/N triggering DCI. Here, a current-ID is used to indicate a slot group ID to which a slot in which DL grant DCI or a corresponding PDSCH is transmitted belongs. In addition, a feedback-ID is used to indicate a (DL PDSCH) slot group ID to be a target of A/N feedback. Here, a total-ID is signaled through DCI, and a feedback-ID can be inferred from a total-ID based on the Method 1.

ii. A UE may transmit A/N feedback for a slot group (PDSCH reception through the slot group) corresponding to a feedback-ID through the time indicated by an A/N transmission timing.

iii. When A/N triggering DCI is the same as the DL grant DCI (i.e., both a current-ID and a feedback-ID (or a total-ID) are signaled through DL grant DCI), a UE may operate to transmit by combining (at the same time, for example, through one PUCCH/PUSCH) 1) A/N feedback for a bundling window corresponding to a timing-A or a slot group (PDSCH reception through the slot group) corresponding to a current-ID and 2) A/N feedback for a slot group (PDSCH reception through the slot group) corresponding to a feedback-ID, through the time indicated by a timing-A.

2) Pooling-Based A/N Feedback Method (p-A/N Method)

A. An operation of delaying (pending/deferring) A/N feedback transmission for a corresponding PDSCH may be indicated through DL grant DCI. Thereafter, through DCI, transmission of A/N feedback for PDSCH(s) corresponding to (i) all DL HARQ process IDs or (ii) specific partial DL HARQ process ID(s) may be indicated (pooling). A/N feedback may be transmitted through timing configured/indicated based on a specific signal (e.g., RRC or DCI signaling). Hereinafter, the above-described method is referred to as a Type-3 A/N codebook.

B. When c-/t-DAI signaling is configured in the t-A/N method (e.g., when a DAI is signaled through DL grant DCI), A/N pooling may be defined as pooling A/N transmission for a PDSCH corresponding to a HARQ process ID (indicated through pooling DCI), or pooling A/N transmission for a PDSCH corresponding to a t-DAI value (indicated through pooling DCI). In the latter case, a UE may transmit A/N information for PDSCH reception corresponding to a c-DAI initial value to a t-DAI value at a time.

3) Dynamic Switching Operation Method Between the t-A/N Method and the p-A/N Method A. As an example, switching between the t-A/N method and the p-A/N method may be indicated through DL grant DCI. That is, it may be indicated whether to configure/transmit A/N feedback by applying either the t-A/N method or the p-A/N method through DL grant DCI. Additionally, both A/N pending and A/N pooling for the p-A/N method may be indicated through the same DL grant DCI. For example, when DL grant DCI indicates the p-A/N method, the DL grant DCI may further indicate whether to indicate pending A/N feedback transmission or pooling.

B. As another example, switching between A/N pending operations for applying the t-A/N method and the p-A/N method may be indicated through DL grant DCI. That is, it may be indicated whether the t-A/N method is applied or A/N feedback transmission is pending for the p-A/N method through DL grant DCI. Here, an A/N pooling operation for the p-A/N method may be indicated through UL grant DCI or (UE (group)) common DCI.

C. As another example, switching between the t-A/N method and A/N pending for the p-A/N may be indicated through DL grant DCI including PDSCH scheduling. That is, it may be indicated whether to apply the t-A/N or to pending A/N transmission for the p-A/N method through DL grant DCI. In this case, A/N pooling for the p-A/N method may be indicated through DL grant DCI that does not include PDSCH scheduling.

4) NFI (New Feedback Indicator) Information Signaling

A. Due to A/N feedback transmission drop of a UE due to LBT failure and/or A/N feedback detection failure in a base station, etc., for the purpose of preventing inconsistency in an A/N codebook (payload) configuration between a UE and a base station (and a CWS (Contention Window Size) update for an LBT operation accompanying an A/N PUCCH (including UL transmission such as a PUSCH, etc.)), a 1-bit NFI may be signaled through (e.g., DL grant or UL grant) DCI triggering A/N feedback transmission. An NFI may indicate the following information in a toggling form.

i. For A/N feedback (hereinafter, previous A/N feedback) transmitted at the previous (recent) time, whether (a) it was properly detected/received by a base station, (b) a base station failed to detect/receive it may be signaled. In the case of (a), a UE processes the remaining parts except for A/N corresponding to a PDSCH scheduled after previous A/N transmission as NACK or DTX (feedback configuration/transmission omitted) to configure/transmit updated A/N feedback. In the case of (b), a UE may configure/transmit A/N feedback by maintaining the remaining parts except for A/N corresponding to a PDSCH scheduled after previous A/N transmission.

ii. In the case of (a), an NFI value toggled from an NFI value received through previous DCI is indicated through current DCI. In the case of (b), an NFI value that is not toggled from an NFI value received through previous DCI may be indicated through current DCI. When a UE receives a toggled NFI, a UE may operate to reset a CWS for an A/N PUCCH (and/or a PUSCH) transmission to the minimum value, but on the other hand, when a UE receives a non-toggle NFI, a UE may operate to increase a CWS value (in a certain unit).

Hereinafter, a DL/UL grant DCI configuration method and signaling information when configuring Type-2a and Type-1 A/N codebooks are proposed. Meanwhile, in this disclosure, DCI (format) in which a field configuration and each field size, etc. in a DCI format are configurable (that is, changeable) is referred to as a non-fallback DCI, and DCI (format) in which a DCI field configuration and respective sizes are not configurable (i.e., fixed) is referred to as fallback DCI. DCI, which is not separately specified as fallback DCI in this disclosure, may mean non-fallback DCI.

(a) DCI Configuration and Signaling Information when Configuring a Type-2a A/N Codebook 1) Information Signaled Through DL Grant DCI A. Basically, it may include the following information (for convenience, basic information).

i. current-ID information ii. Counter-DAI and total-DAI information related to a (PDSCH) slot group corresponding to a current-ID iii. feedback-ID information 1. Alternatively, a total-ID may be signaled through DCI, and feedback-ID information may be determined based on Method 1.

iv. NFI information for A/N feedback corresponding to a current-ID (i.e., NFI for current-ID)

v. NFI information for A/N feedback corresponding to a feedback-ID (i.e., NFI for feedback-ID)

1. Based on Method 2 (regardless of a value indicated by a total-ID), it can be replaced with NFI information for A/N feedback corresponding to an other-ID having a value different from a current-ID (that is, NFI for other-ID).

B. In addition, it may further include the following information.

i. Total-DAI information related to a (PDSCH) slot group corresponding to a feedback-ID 1. Based on Method 2 (regardless of a value indicated by a total-ID), it can be replaced with total-DAI information for A/N feedback corresponding to an other-ID having a value different from a current-ID (that is, total-DAI for other-ID).

C. In addition, it may further include the following information.

i. Whether to configure/transmit A/N feedback based on a Type-3 codebook (e.g., CTI (Codebook Type Indicator) signaling indicating which A/N codebook to configure/transmit among Type-2a and Type-3)

ii. Notes

1. If Type-3 is indicated through DCI (at the specific time), NFI information for Type-3 codebook-based A/N feedback (i.e., NFI for Type-3) may be additionally signaled through DCI.

2. CTI information may be explicitly signaled using a dedicated 1-bit, or implicitly signaled in the following way.

3. In a first method, when A/N feedback transmission is indicated for only one (PDSCH) slot group corresponding to a current-ID through DCI, CTI information may be signaled through a NFI for feedback-ID (or NFI for other-ID) bit/field. When Type-3 is indicated through CTI, through a counter-DAI, a total-DAI bit/field, and/or a NFI for current-ID bit/field, a HARQ process ID group for A/N feedback and/or (in CA situation) CC/cell group may be indicated and/or NFI for Type-3 information may be signaled.

4. In a second method, when A/N feedback transmission is indicated for only one (PDSCH) slot group corresponding to a current-ID through DCI, CTI information may be signaled through a total-DAI for feedback-ID (or total-DAI for other-ID) bit/field. When Type-3 is indicated through CTI, through a counter-DAI, a total-DAI (for current-ID) bit/field, a NFI for current-ID, and/or a NFI for feedback-ID (or NFI for other-ID) bit/field, a HARQ process ID group and/or (in CA situation) CC/cell group to be A/N feedback target may be indicated and/or NFI information for Type-3 may be signaled.

D. In relation to Fallback DCI-based DL scheduling i. Basically, a fallback DCI format may include/signal only current-ID information and/or counter-DAI information (related to a (PDSCH) slot group corresponding to a corresponding ID) among the basic information described above (for convenience, Case 1).

ii. As another method, all of the basic information except a total-DAI for current-ID may be included/signaled in a fallback DCI format.

iii. In this case, for information not included/signaled in fallback DCI, a UE may A/N codebook (payload) based on the most recently detected/received information through non-fallback DL DCI (e.g., feedback-ID (or total-ID), NFI, CTI). Here, non-fallback DL DCI related to the recently detected/received information may be limited to only DCI indicating the HARQ-ACK (PUCCH) transmission time (slot) indicated through fallback DL DCI for the HARQ-ACK (PUCCH) transmission time. If there is no non-fallback DCI indicating the same HARQ-ACK (PUCCH) transmission time as fallback DCI, according to Case 1, a UE may configure/transmit A/N feedback only for a slot group corresponding to a current-ID, and, for NFI for current-ID, a UE may operate to assume/apply a toggled form (or a non-toggled form) (compared to previous A/N feedback or compared to previously (i.e., recently) received a NFI bit). In addition, a UE may operate by assuming/applying that CTI is indicated by a Type-2a codebook.

iv. Meanwhile, in order to prevent in advance A/N feedback mismatch between a UE and a base station due to a UE's DL DCI detection failure, etc., a plurality of fallback DL DCIs indicating the same HARQ-ACK (PUCCH) transmission time (e.g., slot) may be configured to indicate the same current-ID. Accordingly, a UE may operate by assuming that that all of a plurality of fallback DL DCIs indicating the same HARQ-ACK (PUCCH) transmission time indicate the same current-ID, and if other DCI is detected, a UE may ignore the DCI (discard). For example, a UE may not perform an operation indicated by the corresponding DCI.

E. In relation to CB group (CBG) based DL transmission operation i. For a CC/cell in which CBG based DL transmission is configured, total-DAI for feedback-ID (or total-DAI for other-ID) information may be individually signaled for an A/N sub-codebook corresponding to TB based transmission and an A/N sub-codebook corresponding to CBG based transmission.

2) Information Signaled Through UL Grant DCI

A. Basically, it may include the following information (for convenience, basic information).

i. Total-DAI information for a first (PDSCH) slot group ID (hereinafter, first-ID)

ii. Total-DAI information for a second (PDSCH) slot group ID (hereinafter, second-ID)

iii. Notes

1. For example, when up to two (PDSCH) slot groups (index=0, 1) are defined/configured, a first-ID and a second-ID may correspond to slot group indexes 0 and 1, respectively.

2. As another example, a first-ID and a second-ID may be configured/replaced with a current-ID and a feedback-ID (or other-ID), respectively. In this case, current-ID information and feedback-ID (or total-ID) information may be further signaled through DCI.

A. In a case of feedback-ID, a total-ID is signaled through DCI, and feedback-ID information may be determined based on Method 1.

B. An other-ID may be determined as a slot group ID having a different value from a current-ID based on Method 2.

3. As another example, bitmap information for an entire slot group ID/index set (e.g., ID/index=0, 1) may be signaled through DCI. Whether a slot group corresponding to a corresponding ID is an A/N feedback request/transmission target for each slot group ID may be indicated through a corresponding group ID-bitmap.

4. Meanwhile, UL grant DCI may not include slot group ID/index-related information/signaling. In this case, a UE may operate to configure/transmit an A/N codebook (payload) based on the most recently detected/received slot group ID/index information through DL grant DCI. Here, DL grant DCI related to a slot group ID/index may be limited to only DCI indicating the PUSCH transmission time (slot) scheduled through UL grant DCI for the HARQ-ACK transmission time.

B. In addition, it may further include the following information.

i. NFI information for A/N feedback corresponding to a first-ID ii. NFI information for A/N feedback corresponding to a second-ID iii. Notes 1. In this case, A/N feedback transmission (through PUSCH) may be indicated to a UE without additional DL (PDSCH) scheduling/transmission from a base station.

2. Otherwise, UL grant DCI may not include NFI information for A/N feedback. In this case, a UE may operate to configure/transmit an A/N codebook (payload) based on the most recently detected/received NFI information through DL grant DCI (for each (PDSCH) slot group). Here, DL grant DCI related to NFI information may be limited to only DCI indicating the PUSCH transmission time (slot) scheduled through UL grant DCI for the HARQ-ACK transmission time for a PDSCH.

In addition, it may further include the following information.

i. Whether to configure/transmit A/N feedback based on a Type-3 codebook (e.g., indicate which A/N codebook to configure/transmit among Type-2a and Type-3)

ii. Notes

1. If Type-3 is indicated through DCI (at the specific time), NFI information for Type-3 codebook-based A/N feedback may be additionally signaled through a corresponding DCI.

D. In relation to Fallback DCI-based UL Scheduling i. Basically, a fallback DCI format may be a (omitted) form in which all basic information is not included/signaled.

ii. Alternatively, a fallback DCI format may be a form in which all basic information (e.g., total-DAI and/or group ID-bitmap information for each of a first-ID and a second-ID) is included/signaled.

iii. Alternatively, a fallback DCI format may be a form in which {a total-DAI for a first-ID, a total-DAI for a second-ID, NFI for a first-ID, NFI for a second-ID} is included/signaled.

iv. Alternatively, a fallback DCI format may be a form in which {NFI for a first-ID, NFI for a second-ID} (and/or group ID-bitmap information) is included/signaled.

v. In this case, with respect to information not included/signaled in UL grant DCI, a UE may operate to configure/transmit an A/N codebook (payload) based on the most recently detected/received information (e.g., a slot group ID/index, a total-DAI, NFI, a CTI) through DL grant DCI. Here, DL grant DCI related to the recently detected/received information may be limited to only DCI indicating the PUSCH transmission time (slot) scheduled through UL grant DCI for the HARQ-ACK transmission time for a PDSCH.

vi. Meanwhile, when an A/N is piggybacked and transmitted through a CG-PUSCH transmitted without DCI in a configured (Configured Grant, CG) form rather than scheduling accompanying dynamic grant DCI transmission, a UE may operate to configure/transmit an A/N codebook (payload) based on the most recently detected/received information (e.g., a slot group ID/index, a total-DAI, NFI, a CTI) through DL grant DCI. Here, DL grant DCI related to the recently detected/received information may be limited to only DCI indicating the CG-PUSCH transmission time (slot) for the HARQ-ACK transmission time for a PDSCH.

E. In relation to CB group (CBG) based DL transmission operation i. For a CC/cell in which CBG based DL transmission is configured, total-DAI (e.g., a total-DAI for a first-ID and a total-DAI for a second-ID) information may be individually signaled for an A/N sub-codebook corresponding to TB based transmission and an A/N sub-codebook corresponding to CBG based transmission.

Meanwhile, when a UE configures/transmits A/N feedback on a PUCCH/PUSCH based on a Type-2a codebook, a method for a base station to indicate/recognize that "there is no A/N feedback to be piggybacked and transmitted on a PUSCH" to a UE may be needed. For this, the following DCI signaling and operation may be considered.

1) Method 1

A. When a total-DAI bit in UL grant DCI is indicated as '11' (or a total-DAI value is 4) and when there is no DL grant DCI detected during a bundling window duration (or an interval from the previous (e.g., recent) A/N feedback transmission time (or the time indicated by the corresponding transmission time) to a PUSCH transmission timing) corresponding to the PUSCH transmission time and when a NFI bit indicated through UL grant DCI is toggled (compared to the previous A/N feedback or compared to the previous (e.g., recent) received NFI bit), a UE may operate not to piggyback any A/N on a PUSCH. This method may be applied to a method for signaling NFI information through UL grant DCI. Here, a check for DCI information check and a corresponding UE's operation may be performed independently/individually for each (PDSCH) slot group (ID).

B. In another method, for detected/received UL grant DCI (in the absence of separate NFI information signaling through UL grant DCI), the check for DCI/UE's operation is applied/performed, and a NFI bit may be assumed to be non-toggled (or toggled) (compared to the previous A/N feedback or compared to the previous (recently) received NFI bit). This method may be applied to the case of UL grant DCI (format) without separate NFI information signaling (e.g., fallback).

2) Method 2

A. One of states signaled by a total-DAI field in UL grant DCI may be defined as indicating "no A/N feedback" (to be piggybacked on PUSCH). When a corresponding state is indicated through DCI, a UE may operate not to piggyback on any A/N on a PUSCH. This method may be applied to a method without NFI information signaling through UL grant DCI. Here, a check for DCI information and a corresponding UE's operation may be performed independently/individually for each (PDSCH) slot group (ID).

3) Method 3

A. Only one (PDSCH) slot group (e.g., first-ID) may be indicated through first-ID and second-ID (or current-ID and feedback-ID (or total-ID)) bits/fields in UL grant. In this case, through a specific total-DAI field (e.g., a total-DAI field for a second-ID), 1) A/N feedback for only one indicated slot group (e.g., first-ID) (piggyback on a PUSCH)) may be indicated to configure/transmit, or 2) it may be indicated that there is no A/N feedback to be piggybacked on a PUSCH even for an indicated slot group (e.g., first-ID) (i.e., for all slot groups (first-ID and second-ID)). This method may be applied to a method for signaling (PDSCH) slot group ID information through UL grant DCI (there is no NFI information signaling through UL grant DCI). For example, slot group ID information includes a first-ID and a second-ID (or current-ID and feedback-ID (or total-ID)) information).

Meanwhile, in the case of scheduling/indicating (multi-slot scheduling) a plurality of PUSCH resources transmitted over a plurality of slots through single UL grant DCI, an operation of applying total-DAI, NFI, and/or CTI information may be required. The corresponding information may be applied only to, among a plurality of slots or PUSCH resources scheduled through DCI, 1) (a) a PUSCH resource in a first slot (i.e., first-slot PUSCH), (b) a first PUSCH resource (i.e., first PUSCH), (c) an initial PUSCH resource composed of more than a specific number of symbols (or the number of non-DMRS symbols) and/or a specific number of RBs (or the number of REs or the number of non-DMRS REs), (d) a PUSCH resource allocated in a slot immediately following a first slot in which PUSCH transmission is indicated, or (e) a first PUSCH resource (i.e., first full-PUSCH) having the same symbol duration as a slot duration (for example, a specific one resource of the plurality of resources or specific combinations of resources), alternatively, may be applied only to 2) (a) a first successful first-slot PUSCH in LBT (CCA through it), or (b) a first full-PUSCH, alternatively, may be applied only to 3) (a) a first-slot PUSCH in which A/N feedback is transmitted in a piggybacked form, (b) a first PUSCH, or (c) a first full-PUSCH. For the remaining slots or PUSCH resources other than the above, a) an A/N codebook (payload) may be configured/transmitted based on the most recently detected/received information (e.g., a slot group ID/index, a total-DAI, NFI, a CTI, and/or information indicating whether to fallback A/N, information indicating the presence or absence of pended A/N to be described later) through DL grant DCI, and/or b) b) a specific (e.g., default) value may be assumed/applied for the information.

In the of case a), DL grant DCI related to the recently detected/received information may be limited to only DCI indicating the PUSCH transmission time (slot) for the HARQ-ACK transmission time for a PDSCH. Meanwhile, in the case of b), it can be assumed/applied as follows for at least one.

1) For a total-DAI, a total-DAI bit may be assumed/applied as '11' (or a total-DAI value is 4), 2) it may be assumed/applied to be toggled (or non-toggle) (compared to the previous A/N feedback or compared to the previous (e.g., recent) received NFI bit) for NFI, 3) it may be assumed/applied that a Type-2a (or Type-1 in the following case) codebook is indicated as the CTI, 4) in the following, it may be assumed/applied that there is no corresponding field/signaling for "information indicating whether A/N feedback based on a Type-1 codebook", 5) in the following, it may be assumed/applied that there is no corresponding pended A/N feedback for "information indicating the presence or absence of Pended A/N".

(b) DCI Configuration and Signaling Information when Configuring Type-1 A/N Codebook 1) Information Signaled Through DL Grant DCI A. Basically, it may include the following information (for convenience, basic information).

i. Information indicating whether to fallback A/N ii. Notes

1. The information may indicate whether only one fallback DCI scheduling PCell (PDSCH transmission through the PCell) is transmitted during one bundling window period. The information can be configured/signaled with only 1-bit.

B. It may additionally include the following information.

i. Whether to configure/transmit A/N feedback based on a Type-3 codebook (e.g., CTI signaling indicating which A/N codebook to configure/transmit among Type-1 and Type-3)

ii. Notes

1. If Type-3 is indicated through DCI (at the specific time), NFI information for Type-3 codebook-based A/N feedback may be additionally signaled through a corresponding DCI.

C. It may additionally include the following information.

i. Information indicating the presence or absence of Pended A/N ii. Notes

1. The information may indicate whether the final A/N feedback is configured by further including A/N with a pending indication (at the previous time) (i.e., pended A/N) in an A/N payload configured based on a Type-1 codebook.

D. In relation to Fallback DCI-based DL Scheduling i. Basically, a corresponding DCI format (at least corresponding to a PCell/PSCell) may have a form in which the basic information is included/signaled.

ii. Additionally, a fallback DCI format corresponding to a SCell (except for a PCell/PSCell) may have a form in which the basic information is not included/signaled.

E. In relation to CB group (CBG) based DL transmission operation i. When CC/cell in which CBG based DL transmission is configured or when CA including a CC/cell in which CBG based DL transmission is configured, a pended A/N payload may be determined based on the maximum number of (transmissible) CBGs configured for all cells/CCs, that is, the maximum value among the number of (transmissible) CBGs configured for each cell/CC. When a CC/cell in which TB based transmission is configured, or when only CCs/cells in which TB based transmission is configured are aggregated, a pended A/N payload may be determined based on the maximum number of (transmissible) TBs configured for all cells/CCs, that is, the maximum value among the number of (transmissible) TBs configured for each cell/CC.

2) Information Signaled Through UL Grant DCI

A. Basically, it may include the following information (for convenience, basic information).

i. Information indicating whether A/N feedback based on a Type-1 codebook ii. Notes 1. The information may indicate whether to transmit be piggyback an A/N payload configured based on a type-1 codebook to a PUSCH (or whether to piggyback 0-bit (i.e., omit piggyback) or just fallback A/N) and transmit it.

B. It may further include the following information.

i. Whether to configure/transmit A/N feedback based on a Type-3 codebook (e.g., indicate which A/N codebook to configure/transmit among Type-1 and Type-3)

ii. Notes

1. If Type-3 is indicated through DCI (at the specific time), NFI information for Type-3 codebook-based A/N feedback may be further signaled through the DCI.

C. It may further include the following information.

i. Information indicating the presence or absence of Pended A/N ii. Notes

1. The information may indicate whether the final A/N feedback is configured by further including A/N with a pending indication (at the previous time) (i.e., pended A/N) in an A/N payload configured based on a Type-1 codebook.

D. In relation to Fallback DCI-based UL Scheduling i. Basically, a fallback DCI format may have a form in which the basic information is not included/signaled.

ii. For information not included/signaled in UL grant DCI, a UE may operate to configure/transmit an A/N codebook (payload) based on the most recently detected/received information (e.g., information indicating whether fallback A/N, a CTI, information indicating the presence or absence of pended A/N) through DL grant DCI. Here, DL grant DCI related to the recently detected/received information may be limited to only DCI indicating the PUSCH transmission time (slot) scheduled through UL grant DCI for the HARQ-ACK transmission time for a PDSCH.

iii. Meanwhile, an A/N may be piggybacked and transmitted through a CG-PUSCH transmitted without DCI in a CG (Configured Grant) form rather than scheduling accompanying dynamic grant DCI transmission. In this case, a UE may configure/transmit an A/N codebook (payload) based on the most recently detected/received information (e.g., information indicating whether fallback A/N, a CTI, information indicating the presence or absence of pended A/N) through DL grant DCI. Here, DL grant DCI related to the recently detected/received information may be limited to only DCI indicating the CG-PUSCH transmission time (slot) for the HARQ-ACK transmission time for a PDSCH.

E. In relation to CB group (CBG) based DL transmission operation i. Similar to the case of the DL grant DCI above, a pended A/N payload may be determined based on the maximum number of (transmittable) CBGs or TBs configured in all cells/CCs.

Meanwhile, (Type-2a or Type-1 A/N codebook configuration and according to this) an DL/UL grant DCI information configuration and signaling operation may be limited to a case in which a PUCCH cell/CC (e.g., PCell or PSCell) configured to perform PUCCH transmission in a CA situation is a cell/CC operating on a U-band. In this case, DL/UL grant DCI corresponding to all cells/CCs in CA may be configured according to the method proposed in the present disclosure. Meanwhile, when a PUCCH cell/CC is a cell/CC operating on an L-band (in the state in which the existing Type-1 or Type-2 A/N codebook is configured), the same DL/UL grant DCI information configuration and signaling operation as existing one may be applied. In this case, DL/UL grant DCI corresponding to all aggregated cells/CCs may be configured the same as existing one.

As another method, Type-2a or Type-1 A/N codebook configuration and configuration/signaling of DL/UL grant DCI information according to this may be limited to a case in which a cell/CC operating on a U-band is included in a multi-carrier, that is, a set of a plurality of cells/CCs configured as CA to a UE. In this case, DL/UL grant DCI corresponding to all aggregated cells/CCs may be configured as in the above-described proposed method. Meanwhile, when multi-carrier includes only a cell/CC operating on a L-band, the existing Type-1 or Type-2 A/N codebook configuration and configuration/signaling of the existing DL/UL grant DCI information according to this may be applied. In this case, DL/UL grant DCI corresponding to all aggregated cells/CCs may be configured the same as existing one.

(5) Proposed Method 4

(a) A/N Feedback Update for a Specific PDSCH

For a specific PDSCH or HARQ process ID, a processing time (required for PDSCH decoding and A/N preparation operation) may be insufficiently scheduled/indicated from a base station (compared to the minimum processing time that a UE can support). In this case, a UE may operate to feeds back a NACK (or DTX) for a corresponding PDSCH (or HARQ process ID) through the (first) A/N (PUCCH) transmission time indicated by DCI (corresponding to a corresponding PDSCH).

Thereafter, (in a situation where there is no separate retransmission scheduling from a base station for the PDSCH (or HARQ process ID)) (Type-2a codebook-based) A/N feedback transmission for a slot group ID including the PDSCH or (Type-3 codebook-based) A/N feedback transmission for a HARQ process group including the HARQ process ID may be (again) indicated from a base station. In this case, a UE may update A/N feedback for a corresponding PDSCH (or HARQ process ID) by reflecting the actual/final decoding result of a corresponding PDSCH (or HARQ process ID). For example, when a decoding result is an ACK, an ACK for a corresponding PDSCH (or HARQ process ID) may be fed back through the A/N (PUCCH) transmission time indicated (again) from a base station.

Meanwhile, the above operation may be applied regardless of whether or not NFI toggling corresponding to a PDSCH (or HARQ process ID), or applied only in one case among a case in which corresponding NFI is non-toggled and a case in which corresponding NFI is toggled. In this case, in another case, the feedback update as described above may be omitted (e.g., the previous feedback is maintained).

Additionally, when a processing time for a HARQ process ID is insufficiently scheduled/indicated from a base station, an update (hereinafter, updated feedback) of HARQ-ACK feedback transmitted by a UE through the corresponding HARQ-ACK transmission time may vary according to an NDI value indicated for the corresponding HARQ process ID. For example, in a situation in which an NDI value is not toggled (compared to the previous value), when a UE previously fed back an ACK for a corresponding HARQ process ID and/or an actual/final PDSCH decoding result was an ACK, a UE may update/report HARQ-ACK feedback (e.g., updated feedback) with an ACK. As another example, in a situation in which an NDI value is not toggled (relative to the previous value), when a UE previously fed back a NACK for a corresponding HARQ process ID and/or an actual/final PDSCH decoding result was a NACK, a UE may report HARQ-ACK feedback (e.g., updated feedback) with a NACK. As another example, when a NDI is indicated in a toggled state (compared to the previous value) and a new TB or PDSCH is scheduled/transmitted, due to a lack of processing time for a corresponding TB or PDSCH, a UE may report HARQ-ACK feedback (e.g., updated feedback) with an invalid value (e.g., NACK).

(b) CBG Retransmission Set CC Related A/N Feedback

When A/N feedback transmission based on a Type-3 codebook is indicated from a base station, a size of an A/N payload transmitted through a PUCCH (or PUSCH) may increase in proportion to the number of CCs configured for a UE, the number of HARQ processes configured for each CC, the maximum number of TBs or the maximum number of CBGs configured for each CC. Among them, in particular, the number of CBGs may be a factor in rapidly increasing a size of an A/N payload compared to other parameters, which may cause a lot of PUCCH resource overhead.

Considering the problem of increasing UL (PUCCH) resource overhead as above, when A/N feedback transmission based on a Type-3 codebook is indicated, for a CC in which CBG based (re)transmission is configured, it may be operated to generate/map/transmit a TB-level A/N for each HARQ process ID. Although not limited thereto, for a CC in which CBG based (re)transmission is configured, TB-level A/N may be generated by bundling A/N between CBs or between CBGs corresponding to the same single HARQ process ID. For example, TB-level A/N may be generated by applying a logical AND operation between CB-level A/Ns for each of the plurality of CBs or between CBG-level A/Ns for each of the plurality of CBGs. Through this, an A/N payload size and PUCCH resource overhead may be reduced. Meanwhile, in a case of not A/N feedback transmission based on a Type-3 codebook (e.g., Type-1/2 codebook), for a CC in which CBG based (re)transmission is configured, it may be operated to generate/map/transmit CBG-level A/N for a corresponding PDSCH (or HARQ process ID).

Alternatively, when Type-3 codebook-based A/N feedback transmission is indicated, for a CC configured for CBG based (re)transmission, whether to generate/transmit TB-level A/N, or to generate/transmit CBG-level A/N may be configured through a higher layer signal (e.g., RRC signaling).

(c) Handling for A/N Feedback Misalignment

In a situation in which A/N feedback transmission based on a Type-1 codebook is configured, a UE may feedback/transmit an ACK for HARQ process ID=X at the specific time (e.g., slot #n). Thereafter, A/N feedback transmission based on a type-3 codebook at another specific time (e.g., slot #(n+K)) may be indicated from a base station to a UE. Meanwhile, when specific DCI schedules a PDSCH corresponding to HARQ process ID=X, the specific DCI may indicate the same time as the time (e.g., slot #(n+K)) at which type-3 codebook-based A/N transmission is indicated for A/N transmission timing for the PDSCH. If a UE fails to detect the corresponding DCI, A/N feedback misalignment (e.g., DTX-to-ACK error) may occur between a UE and a base station for HARQ process ID=X in a type-3 codebook. This may unnecessarily result in inefficient (RLC level) retransmissions.

To solve the above problem, if the specific time (e.g., slot Y) is indicated as the type-3 codebook-based A/N transmission time, a UE does not expect DCI (reception) indicating slot Y as A/N transmission timing while scheduling PDSCH transmission (and/or scheduling an initial transmission of a new TB (or indicating a toggled NDI value)), and may operate under the assumption that there is no such DCI. Accordingly, when receiving/receiving the DCI as described above, a UE may ignore the DCI. For example, a UE may not perform an operation indicated by the corresponding DCI.

Meanwhile, for the DCI that a UE does not expect and ignore, DCI that schedules PDSCH transmission and at the same time indicates type-3 codebook-based A/N transmission may be excluded. That is, the UE may perform a corresponding operation without ignoring the corresponding DCI. For example, a UE may configure/transmit type-3 codebook-based A/N feedback including an A/N for PDSCH scheduled by the corresponding DCI.

(d) PDSCH Processing in which A/N Pending is Indicated

First, in a state in which a Type-1 A/N codebook method is configured to a UE, when a PDSCH in which A/N pending is indicated through specific DL grant DCI (e.g., in a form in which an A/N timing for a PDSCH is indicated as invalid or non-numeric value), for A/N feedback (hereinafter, pended A/N) for the corresponding PDSCH, 1) a form of transmitting (by a UE) the corresponding pended A/N in a form of a Type-3 A/N codebook by indicating a separate A/N pooling through DCI, or 2) an operation of appending the corresponding pended A/N to a Type-1 A/N codebook transmitted through an A/N timing indicated (e.g., indicated in a form in which an A/N timing for a PDSCH is indicated as valid or a numeric value) by another DL grant DCI without a separate A/N pooling may be considered. Meanwhile, when considering the operation of configuring and transmitting an A/N payload in a form of appending pended A/N to a Type-1 A/N codebook as described above, it is essential to configure/perform mapping so that 1) the total number of pended A/N information/bits to be appended, and 2) a mapping order of the corresponding pended A/N information/bit on the A/N payload match between a UE and a base station. If there is a mismatch between a UE and a base station with respect to the number/mapping of the pended A/N on the A/N payload, since UCI decoding performance is deteriorated and serious ACK/NACK errors (e.g., NACK-to-ACK) are generated, unnecessary PDSCH retransmission overhead and large latency may occur.

In consideration of the above problem, (maximum) pended A/N information/the number of bits (e.g., P bits) that can be appended to a Type-1 A/N codebook may be configured to a UE (by a base station) through RRC signaling. A UE may configure a final A/N payload by always appending the corresponding P bits to a Type-1 A/N codebook regardless of the presence or absence of an actual pended A/N. As another method, whether there is a pended A/N (or whether to appending the P bits) may be indicated to a UE (by a base station) through a specific (e.g., 1-bit) field in DCI (e.g., DL grant). According to information indicated by the corresponding field, a UE may configure a final A/N payload in a form that appends or does not append a pended A/N bit(s) (or the corresponding P bits) to a Type-1 A/N codebook. As another method, a plurality of candidates (having different values including 0) for the appended number of pended A/N bits P may be configured to a UE (through RRC), and a value of one of the candidates may be indicated through a specific field in DCI (e.g., DL grant). A terminal may configure a final A/N payload by appending the number of bits corresponding to the indicated value to a Type-1 A/N codebook.

Meanwhile, a final A/N payload may be configured in a form in which a Type-1 A/N codebook is preferentially mapped to a lower bit index part starting with a most significant bit (MSB) (e.g., configured as a form of a first A/N sub-codebook), and then pended A/N information is mapped (to a higher bit index part) after it (e.g., configured as a form of a second A/N sub-codebook). Additionally, in order to match a mapping order between pended A/N information/bits on an A/N payload, through a specific field in DCI (e.g., DL grant) indicating an A/N pending operation, an order value (e.g., counter-DAI) of the number of times a PDCCH/PDSCH corresponding to A/N pending indicated to a UE is scheduled/transmitted (among all PDCCH/PDSCHs for which A/N pending is indicated) may be indicated (by a base station). A UE may configure a final A/N payload in a form of appending the configured/mapped pended A/N bit(s) (payload) according to an order of the corresponding order value (in a Type-1 A/N codebook). In this case, a field indicating the order value in DCI (e.g., DL grant) may be applied as a field used for counter-DAI signaling, or may be determined/considered as a field for allocating a PUCCH resource (to be used for A/N feedback transmission) (e.g., PUCCH Resource Indicator, PRI).

Meanwhile, in a state in which an A/N pending operation is indicated for a corresponding PDSCH through DCI (e.g., DL grant) at a specific time, (pended) A/N feedback for the corresponding PDSCH may be transmitted through an A/N timing indicated (as a Type-1 codebook-based A/N feedback time) from another DCI at a specific time later. In this case, it may be necessary to determine the corresponding A/N timing (to which pended A/N is to be transmitted). For this purpose, through each DCI, whether to transmit (additionally) pended A/N (for a PDSCH in which A/N pending was indicated at the previous time) may be directly indicated at the A/N timing indicated by the corresponding DCI. Here, DCI may include, for example, DCI triggering A/N feedback based on a Type-1 codebook. As another method, the corresponding pended A/N may be transmitted (by appending) through the earliest among the A/N timings indicated from DCIs (e.g., in which A/N timing for a PDSCH is indicated as valid or a numerical value) transmitted after the (DCI or PDSCH transmission) time at which A/N pending is indicated. Here, DCI may include, for example, DCI triggering A/N feedback based on a Type-1 codebook.

Additionally, in order to prevent mismatch between a UE and a base station for A/N payload, a method of configuring/designating the time at which pended A/N transmission is allowable may be considered, as described above (transmitted through the same UL time by being appended to a Type-1 A/N codebook). Specifically, when an A/N pending operation is indicated for a PDSCH transmitted in slot #n or through DCI (e.g., DL grant) transmitted in slot #n, it may be configured/designated so that the corresponding pended A/N transmission is allowable only through a PUCCH (PUSCH) (carrying a Type-1 A/N codebook) transmitted through the time (and/or the time including/before slot #(n+T+F)) including/after slot #(n+T). In addition, when a PDSCH reception slot corresponding to pended A/N coincides with slot X included in a bundling window corresponding to an A/N transmission timing indicated through DCI (e.g., DL grant), a UE may configure a Type-1 A/N codebook for the bundling window in a form of mapping pended A/N information/bit to an A/N bit corresponding to slot X.

In addition, in a state in which a Type-2 A/N codebook method is configured to a UE, in case of a PDSCH in which A/N pending is indicated through specific DL grant DCI (e.g., in a form in which an A/N timing for a PDSCH is indicated as invalid or non-numeric value), for (pended) A/N feedback for the corresponding PDSCH, 1) an operation of transmitting (by a UE) the corresponding pended A/N in a form of a Type-3 A/N codebook by indicating a separate A/N pooling through specific DCI, or 2) an operation of appending the corresponding pended A/N to a Type-2 A/N codebook transmitted through an A/N timing indicated (e.g., indicated in a form in which an A/N timing for a PDSCH is indicated as valid or a numeric value) by another DL grant DCI without a separate A/N pooling may be considered. Meanwhile, similarly, when considering the operation of configuring and transmitting an A/N payload in a form of appending pended A/N to a Type-2 A/N codebook as described above, it is essential to configure/perform mapping so that 1) the total number of pended A/N information/bits to be appended, and 2) a mapping order of the corresponding pended A/N information/bit on the A/N payload match between a UE and a base station (in terms of UCI decoding performance and PDSCH retransmission overhead/latency).

In consideration of this, in order to match (between a UE and a base station) the total number of pended A/N information/bits on an A/N payload and a mapping order between pended A/N information/bits, through a specific field in DCI (e.g., DL grant) indicating an A/N pending operation, information on an order value (e.g., counter-DAI) of the number of times a PDCCH/PDSCH corresponding to A/N pending indicated through the DCI is scheduled/transmitted (among all PDCCHs/PDSCHs for which A/N pending is indicated) and/or a total value (e.g., total-DAI) of the total number of PDCCHs/PDSCHs for which A/N pending is indicated to a UE until the current time may be informed (by a base station). Accordingly, a UE may configure a final A/N payload in a form of appending the pended A/N bit(s) (payload) (to a Type-2 A/N codebook) configured/mapped based on the corresponding total value and/or according to an order of the corresponding order value. Meanwhile, a final A/N payload may be configured in a form in which a Type-2 A/N codebook is preferentially mapped to a lower bit index part starting with a MSB (e.g., configured as a form of a first A/N sub-codebook), and then pended A/N information is mapped (to a higher bit index part) after it (e.g., configured as a form of a second A/N sub-codebook).

Meanwhile, in a state in which an A/N pending operation is indicated for a corresponding PDSCH through DCI (e.g., DL grant) at a specific time, (pended) A/N feedback for the corresponding PDSCH may be transmitted through an A/N timing indicated (as a Type-2 codebook-based A/N feedback time) from another DCI at a specific time later. In this case, it may be necessary to determine the corresponding A/N timing (to which pended A/N is to be transmitted). For this purpose, through each DCI, whether to transmit (additionally) pended A/N (for a PDSCH in which A/N pending was indicated at the previous time) may be directly indicated at the A/N timing indicated by the corresponding DCI. Here, DCI may include, for example, DCI triggering A/N feedback based on a Type-2 codebook. As another method, the corresponding pended A/N may be transmitted (by appending) through the earliest among the A/N timings indicated from DCIs (e.g., in which A/N timing for a PDSCH is indicated as valid or a numerical value) transmitted after the time (for DCI or PDSCH transmission) at which A/N pending is indicated. Here, DCI may include, for example, DCI triggering A/N feedback based on a Type-2 codebook.

In addition, in a state in which a Type-2a A/N codebook method is configured to a UE, in case of a PDSCH in which A/N pending is indicated (and designated with specified (PDSCH) slot group ID=X) through specific DL grant DCI, for (pended) A/N feedback for the corresponding PDSCH, 1) pended A/N may be transmitted (by a UE) in a form of a Type-3 A/N codebook by indicating a separate A/N pooling through specific DCI, or 2) pended A/N may be included in a Type-2a A/N codebook transmitted through an A/N timing indicated by another DL grant DCI (e.g. requesting A/N feedback for slot group ID=X) without a separate A/N pooling may be considered. Meanwhile, in the latter case, it may be necessary to determine an A/N timing at which pended A/N feedback is transmitted. As a method for this, pended A/N is transmitted (by appending) through the earliest among the A/N timings indicated from specific DCIs (e.g., requesting A/N feedback for slot group ID=X (while triggering Type-2a codebook-based A/N feedback)) (e.g., in which an A/N timing for a PDSCH is indicated as valid or a numeric value) transmitted after the time (for DCI or PDSCH transmission) at which A/N pending is indicated.

Additionally, when a Type-1 or Type-2 A/N codebook method is configured, an operation of dynamically triggering A/N feedback transmission based on a Type-3 A/N codebook method through specific DCI may be applied/allowed. On the other hand, when a Type-2a A/N codebook method is configured, it may be specified/defined so that DCI-based dynamic Type-3 A/N codebook triggering is not applied/allowed. In addition, when a Type-1 or Type-2 A/N codebook method is configured, an A/N pending indication operation (in a form of indicating an invalid or non-numeric A/N timing value for a PDSCH) as described above through DCI (e.g., DL grant) may not be applied/allowed. On the other hand, when a Type-2a method is configured, it may be specified/defined so that an A/N pending indication operation (in a form of indicating an invalid or non-numeric A/N timing value) through DCI is applied/allowed.

(e) A/N Feedback Transmission Operation for SPS PDSCH

First, SPS (Semi-Persistent Scheduling) will be described. For general unicast data (e.g., PDSCH), a resource is dynamically allocated for every transmission by scheduling (e.g., DCI).

In contrast, SPS is a method of reserving a resource in advance for traffic that occurs periodically with a required data rate of medium/low speed, such as VoIP or streaming. SPS can reduce scheduling overhead and allocate a resource stably by reserving a resource for specific traffic in advance.

Figure 15:
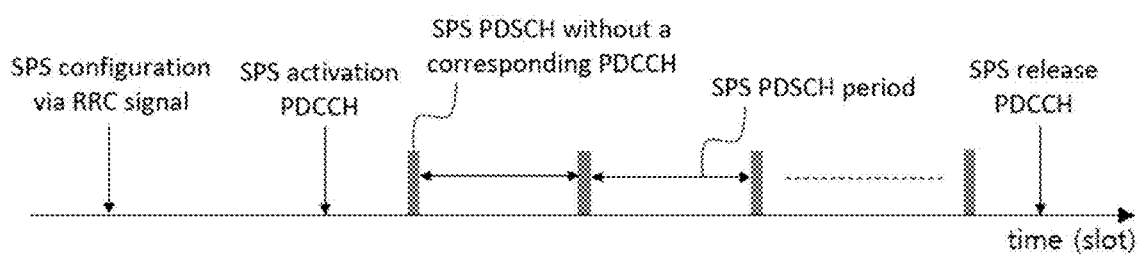
FIG. 15 illustrates semi-persistent scheduling (SPS).

FIG. 15 illustrates DL SPS transmission. In reference to FIG. 15, SPS configuration information is provided by RRC (Radio Resource Control) signaling, and the SPS configuration information may include an SPS PDSCH period/offset, etc. Here, SPS configuration information may include information on an SPS time resource, and the SPS time resource may include an SPS PDSCH period/offset, etc. A UE does not immediately receive an SPS PDSCH even if the UE is allocated SPS configuration information by RRC signaling, and SPS activation/release is performed through a PDCCH. When a UE receives a PDCCH for SPS activation (SPS activation PDCCH), the UE receives an SPS PDSCH in a slot allocated by RRC signaling. An SPS activation PDCCH carries RB allocation information and MCS (Modulation and Coding Scheme) information for an SPS PDSCH. Thereafter, based on scheduling information in an SPS activation PDCCH, an SPS PDSCH is periodically received in accordance with an SPS PDSCH period without a corresponding PDCCH. Meanwhile, when a UE receives a PDCCH for SPS release (SPS release PDCCH), the UE stops receiving an SPS PDSCH. A/N information for an SPS PDSCH may be transmitted based on PUCCH resource information/HARQ timing information (e.g., PDSCH-to-HARQ-ACK reporting offset (K1); see FIG. 6) in an SPS activated PDCCH.

Figure 16:
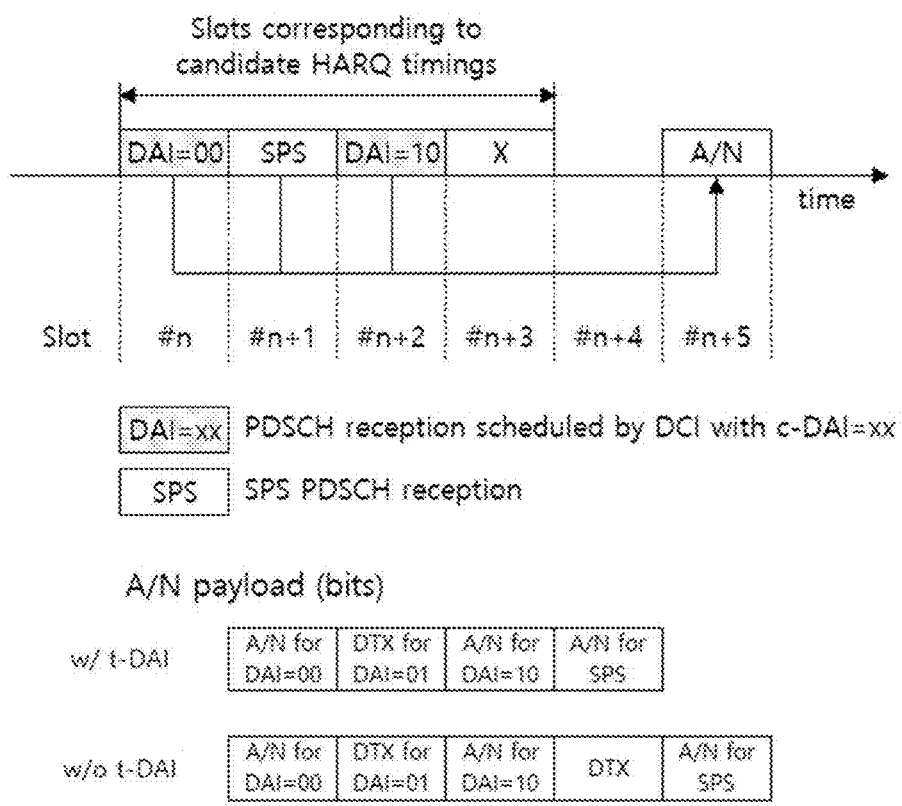
FIG. 16 illustrates an A/N payload configuration based on a Type-2 codebook.

FIG. 16 illustrates an existing Type-2 A/N codebook method. FIG. 16 is basically the same as FIG. 12B, except that an SPS PDSCH is added. In reference to FIG. 16, a UE may receive a PDSCH scheduled by DCI with DAI=00 in slot #n, and receive a PDSCH scheduled by DCI with DAI=10 in slot #(n+2). In addition, a UE may receive an SPS PDSCH in slot #(n+1). An A/N for an SPS PDSCH is appended to the end of a DAI-based A/N codebook. Specifically, when t-DAI=3 is signaled, a UE may generate/transmit A/N information only for reception of three PDSCHs corresponding to consecutive DAI values (i.e., DAI=00/01/11) (hereinafter, DAI sequence). Here, an A/N response to PDSCH reception corresponding to DAI=01 is processed as a NACK, and an A/N for an SPS PDSCH is appended after an A/N for a DAI sequence. In addition, when t-DAI is not signaled, a UE may generate/transmit A/N information for PDSCH reception in all slots corresponding to candidate HARQ timings. An A/N for a DAI sequence is located at an MSB part of an A/N payload, and an A/N for an SPS PDSCH is located at the end of an A/N payload.

Meanwhile, an SPS PDSCH transmitted without a corresponding DCI (e.g., DL grant) and A/N feedback for the SPS PDSCH in a situation where a Type-2a (or Type-1 or Type-2) A/N codebook method is configured/indicated may be considered. For more details about a Type-2a (or Type-1 or Type-2) A/N codebook method, refer to Proposed Method 3. In this case, since a retransmission request (e.g., according to LBT failure of a UE and/or A/N detection failure of a base station) for A/N feedback corresponding to an SPS PDSCH is not possible because there is no separate slot group ID designation for an SPS PDSCH, 1) A/N feedback transmission time for an SPS PDSCH, and 2) A/N feedback configuration/mapping rule on a Type-2a A/N codebook may be required.

First, in case of A/N feedback transmission time for an SPS PDSCH, for example, an SPS PDSCH period is configured with L slots and an A/N timing (delay) corresponding to an SPS PDSCH is indicated with K slots. In this case, A/N feedback for an SPS PDSCH transmitted in slot #n may be transmitted (repeatedly) through all A/N timings indicated in an interval from slot #(n+K) to slot #(n+K+L−1). Alternatively, Type-2a (or Type-1 or Type-2) codebook-based A/N feedback for an SPS PDSCH transmitted in slot #n is transmitted only through slot #(n+K), and it may be (additionally) transmitted through the time indicated by a Type-3 codebook-based A/N timing in an interval from slot #(n+K) to slot #(n+K+L−1). As another method, when operating in a Type-2a A/N codebook method, a specific (slot) group ID to which SPS PDSCHs to be transmitted later belong may be designated through SPS activation DCI (e.g., SPS activation PDCCH). Accordingly, when configuring/transmitting A/N feedback for the corresponding (slot) group ID (according to a request from a base station), it may be configured/transmitted including an A/N for the corresponding SPS PDSCH.

Figure 17:
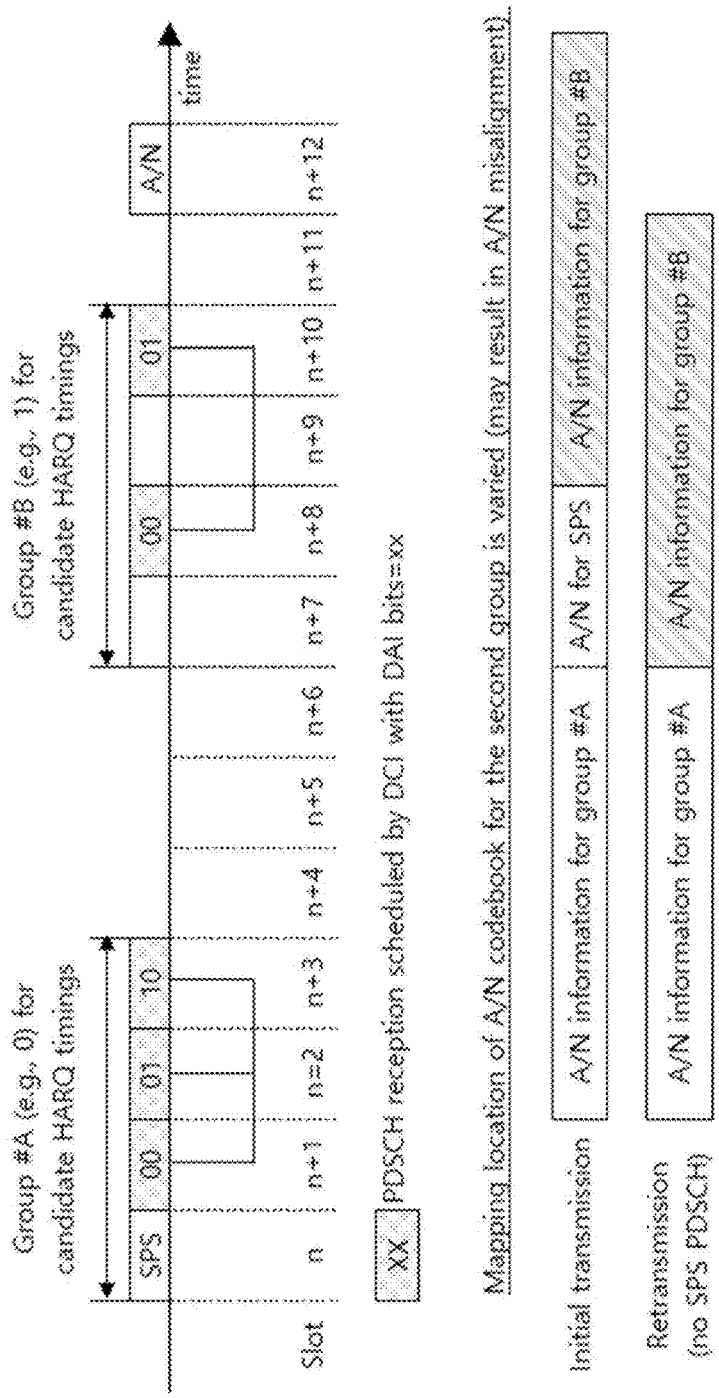
FIG. 17 illustrates a problem in simultaneous transmission of an A/N for a SPS PDSCH.

FIG. 17 illustrates a problem in an A/N configuration/mapping for an SPS PDSCH on a Type-2a A/N codebook. FIG. 17 exemplifies a case in which an A/N for an SPS PDSCH and an A/N for PDSCHs for which a slot group ID is designated through DCI (e.g., DL grant) are configured/mapped without separating them in an A/N codebook is exemplified. In reference to FIG. 17, a UE receives a PDSCH(s) corresponding to group #A (e.g., group ID #0) and a PDSCH(s) corresponding to group #B (e.g., group ID #1). In addition, a UE receives an SPS PDSCH in a candidate HARQ timing interval corresponding to group #A. It is assumed that a UE receives a request for A/N transmission for group #A/#B. In this case, the A/N transmission time for an SPS PDSCH may overlap with the A/N transmission time for group #A/#B. In this case, according to the conventional Type-2 A/N codebook method illustrated in FIG. 16, an A/N for an SPS PDSCH may be appended to the end of A/N information for group #A.

However, A/N information for group #A/#B can be requested for A/N retransmission, respectively, however an SPS PDSCH does not have a group ID, so an A/N retransmission request is impossible. Accordingly, an A/N payload configuration/mapping is different when initial transmission and retransmission of A/N information for group #A/#B are performed. This is because when A/N information for group #A/#B is retransmitted, an SPS PDSCH may not exist or a new SPS PDSCH may exist. Due to this, for example, as illustrated in the figure, a location of A/N information for group #B in an A/N payload may vary depending on the A/N transmission time, so a problem such as A/N mismatch between a UE and a base station may occur.

Therefore, in the present proposal, an A/N configuration/mapping for an SPS PDSCH on a Type-2a A/N codebook may be configured/mapped by separating from an A/N for PDSCHs to which a slot group ID is assigned through DCI (e.g., DL grant). As an example, on an A/N payload of a Type-2 codebook, it may be configured that an A/N for a PDSCH for which a slot group ID is designated may be mapped to a lower bit index part starting with a most significant bit (MSB) (e.g., configured as a form of a first A/N sub-codebook), and then an A/N for an SPS PDSCH is mapped (to a higher bit index part) after it (e.g., configured as a form of a second A/N sub-codebook).

Figure 18:
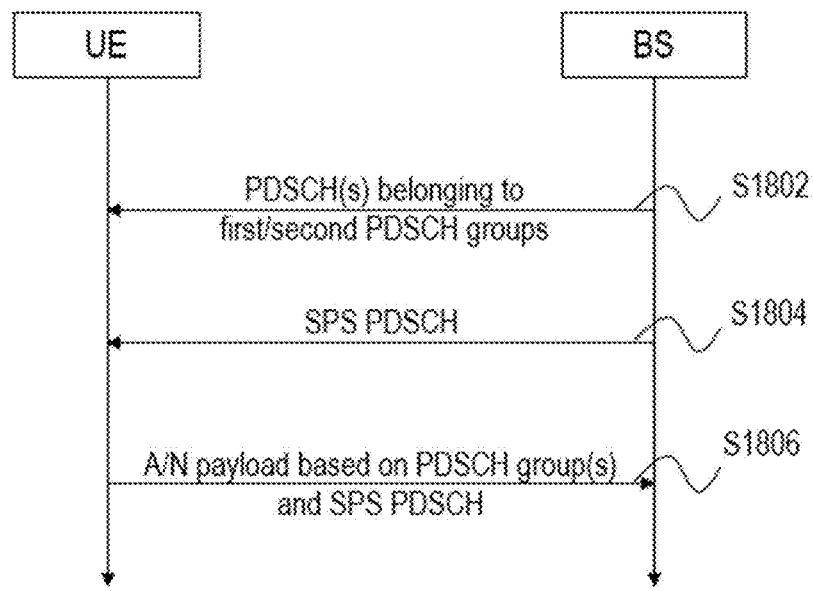
FIGS. 18 to 19 illustrates A/N transmission according to an embodiment of the present disclosure.

FIG. 18 illustrates an A/N transmission process according to an embodiment of the present disclosure. In reference to FIG. 18, a UE may receive a PDSCH(s) belonging to a first PDSCH group and a PDSCH(s) belonging to a second PDSCH group (S1802). Here, a PDSCH group corresponds to a (slot) group, and each PDSCH group is used as a basic group for an A/N request. In addition, a UE may receive an SPS PDSCH (S1804). Thereafter, a UE may generate first A/N information for a first PDSCH group and/or second A/N information for a second PDSCH group. Here, based on an A/N for an SPS PDSCH being transmitted together with the first A/N information (and the second A/N information), the A/N for the SPS PDSCH may be appended after the first A/N information (and second A/N information). Thereafter, a UE may transmit control information including the first A/N information (and the second A/N information) and the A/N for the SPS PDSCH (S1806). Here, control information may be transmitted through a PUCCH or a PUSCH.

In addition, an SPS PDSCH may be generalized to a specific PDSCH that does not belong to any PDSCH group (i.e., a PDSCH without a designated group ID). In addition, although A/N retransmission is allowed for the first and second A/N information, respectively, but A/N retransmission may not be allowed for the A/N for the SPS PDSCH. In addition, receiving DCI for PDSCH scheduling may be further included, and the DCI may include A/N request information for the first PDSCH group and A/N request information for the second PDSCH group. In addition, the proposed method may be limitedly applied when operating in an unlicensed band (e.g., a shared spectrum). For example, the control information may be transmitted in an unlicensed band.

Figure 19:
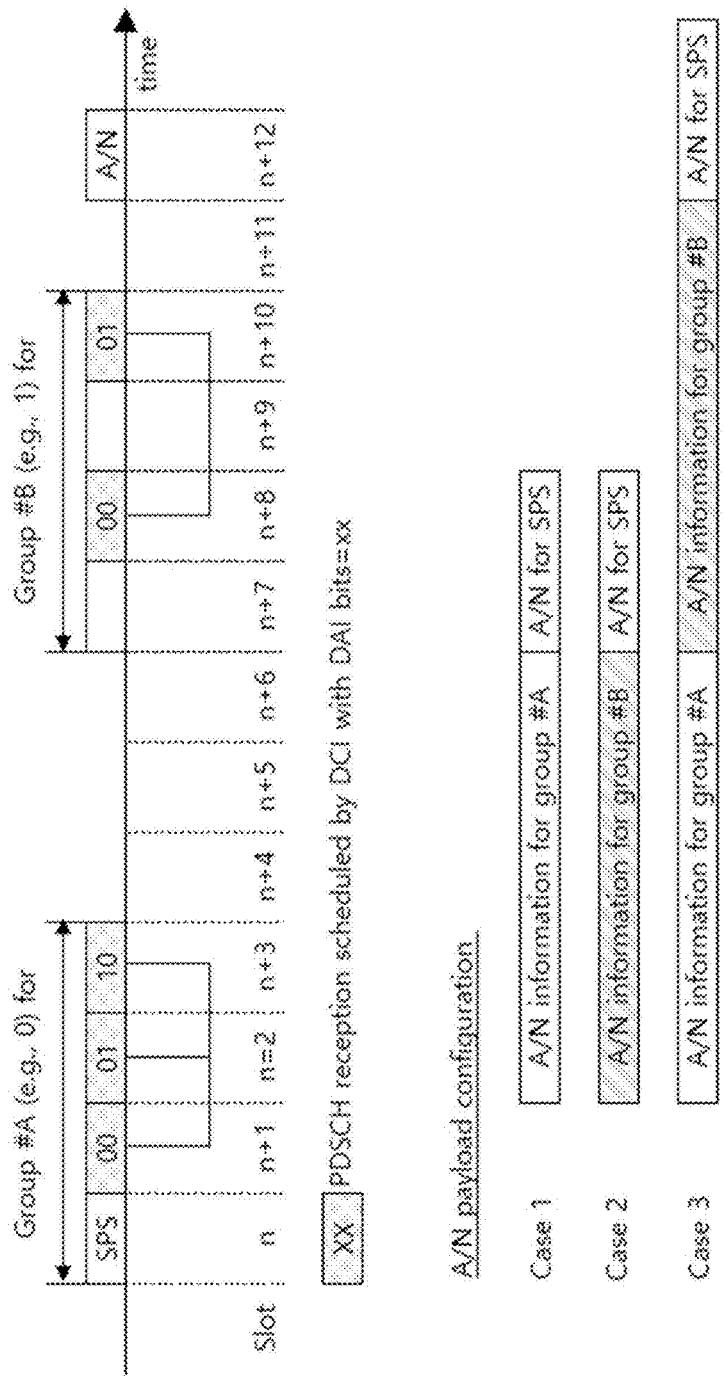

FIG. 19 illustrates an A/N payload configuration according to an embodiment of the present disclosure. The PDSCH reception situation of FIG. 17 is assumed, and an A/N payload configuration is possible as a part of FIG. 18. A base station may request from a UE (case 1) only first A/N information for a first PDSCH group (e.g., group #A), or (case 2) only second A/N information for a second PDSCH group (e.g., group #B), or (case 3) an A/N for both first and second PDSCH groups. Accordingly, in an A/N payload, an A/N for each group and an A/N for an SPS PDSCH may be configured as follows.

Case 1: [A/N information for group #A]+[A/N for an SPS PDSCH]
Case 2: [A/N information for group #A]+[A/N for an SPS PDSCH]
Case 3: [A/N information for groups #A/#B]+[A/N for an SPS PDSCH]

In addition, an A/N configuration/mapping for an SPS PDSCH on a Type-3 A/N codebook may be configured/mapped separately from an A/N for PDSCHs for which a HARQ process ID is designated through DCI (e.g., DL grant). As an example, on an A/N payload of a Type-3 codebook, it may be configured that an A/N for a PDSCH for which a HARQ process ID may designated through DCI is mapped to a lower bit index part starting with a most significant bit (MSB) (e.g., configured as a form of a first A/N sub-codebook), and then an A/N for an SPS PDSCH is mapped (to a higher bit index part) after it (e.g., configured as a form of a second A/N sub-codebook).

Figure 20:
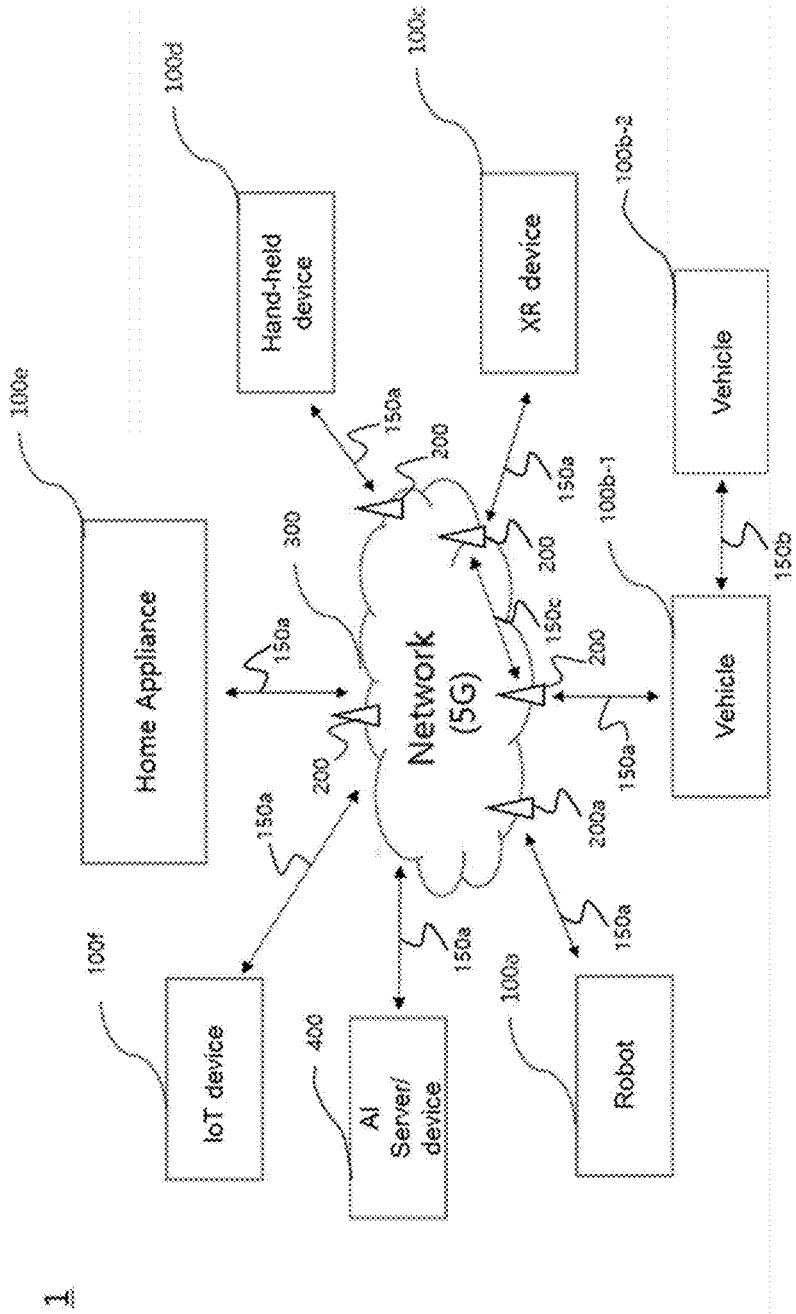
FIGS. 20 to 23 illustrates a communication system (1) and a wireless device applied to the present disclosure.

FIG. 20 illustrates a communication system 1 to which the present disclosure is applied.

Referring to FIG. 20, a communication system 1 applied to the present disclosure includes a wireless device, a base station, and a network. Here, the wireless device means a device that performs communication using a wireless access technology (e.g., 5G NR (New RAT), LTE (Long Term Evolution)), and may be referred to as a communication/wireless/5G device. Although not limited thereto, the wireless device may include robots 100a, vehicles 100b-1 and 100b-2, an extended reality (XR) device 100c, a hand-held device 100d, and a home appliance 100e. an Internet of Thing (IoT) device (100f), and an AI device/server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). The XR device includes AR (Augmented Reality)/VR (Virtual Reality)/MR (Mixed Reality) devices, and it may be implemented in the form of a HMD (Head-Mounted Device), a HUD (Head-Up Display) in a vehicle, a TV, a smartphone, a computer, a wearable device, a home appliance, a digital signage, a vehicle, a robot, and the like. The hand-held device may include a smart phone, a smart pad, a wearable device (e.g., a smart watch, a smart glass), a computer (e.g., a notebook computer, etc.). The home appliance may include a TV, a refrigerator, a washing machine, and the like. The IoT device may include a sensor, a smart meter, and the like. For example, the base station and the network may be implemented as a wireless device, and the specific wireless device 200a may operate as a base station/network node to other wireless devices.

The wireless devices 100a to 100f may be connected to the network 300 through the base station 200. AI (Artificial Intelligence) technology may be applied to the wireless devices 100a to 100f, and the wireless devices 100a to 100f may be connected to the AI server 400 through the network 300. The network 300 may be configured using a 3G network, a 4G (e.g., LTE) network, or a 5G (eg, NR) network, and the like. The wireless devices 100a to 100f may communicate with each other through the base station 200/network 300, but may communicate directly (e.g. sidelink communication) without passing through the base station/network. For example, the vehicles 100b-1 and 100b-2 may perform direct communication (e.g. V2V (Vehicle to Vehicle)/V2X (Vehicle to everything) communication). In addition, the IoT device (e.g., sensor) may directly communicate with other IoT devices (e.g., sensors) or other wireless devices 100a to 100f.

Wireless communication/connections 150a, 150b, and 150c may be established between the wireless devices 100a to 100f/base station 200 and the base station 200/base station 200. Here, wireless communication/connection may be achieved through various wireless access technologies (e.g. 5G NR) such as uplink/downlink communication 150a, sidelink communication 150b (or D2D communication), base station communication 150c (e.g., relay, Integrated Access Backhaul (IAB)). Through wireless communication/connections 150a, 150b, 150c, the wireless device and the base station/wireless device, and the base station and the base station can transmit/receive radio signals to each other. For example, the wireless communication/connection 150a, 150b, 150c may transmit/receive signals through various physical channels. To this end, based on various proposals of the present disclosure, for transmitting/receiving radio signals, at least some of a process of configuring various configuration information, various signal processing processes (e.g., channel encoding/decoding, modulation/demodulation, resource mapping/demapping, etc.), and resource allocation process may be performed.

Figure 21:
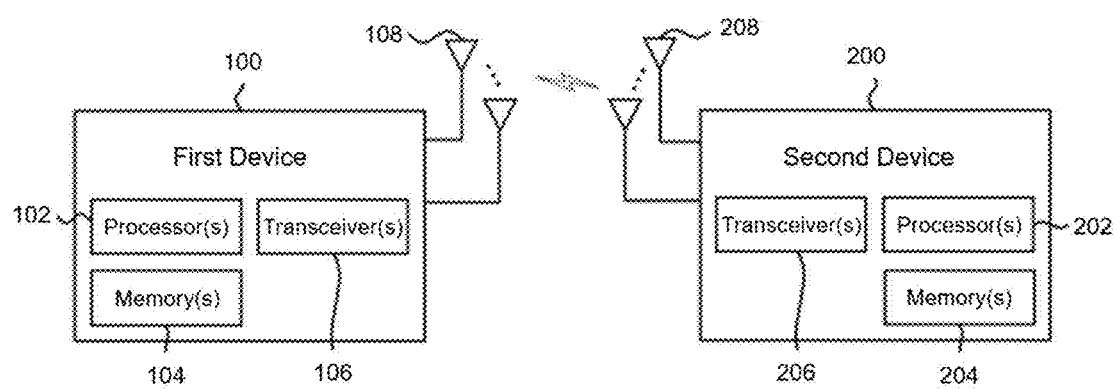

FIG. 21 illustrates a wireless device to which the present disclosure is applied.

In reference to FIG. 21, a first wireless device 100 and a second wireless device 200 may transmit and receive a wireless signal through a variety of radio access technologies (e.g., LTE, NR). Here, {first wireless device 100, second wireless device 200} may correspond to {wireless device 100x, base station 200} and/or {wireless device 100x, wireless device 100x} of FIG. 20.

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Figure 22:
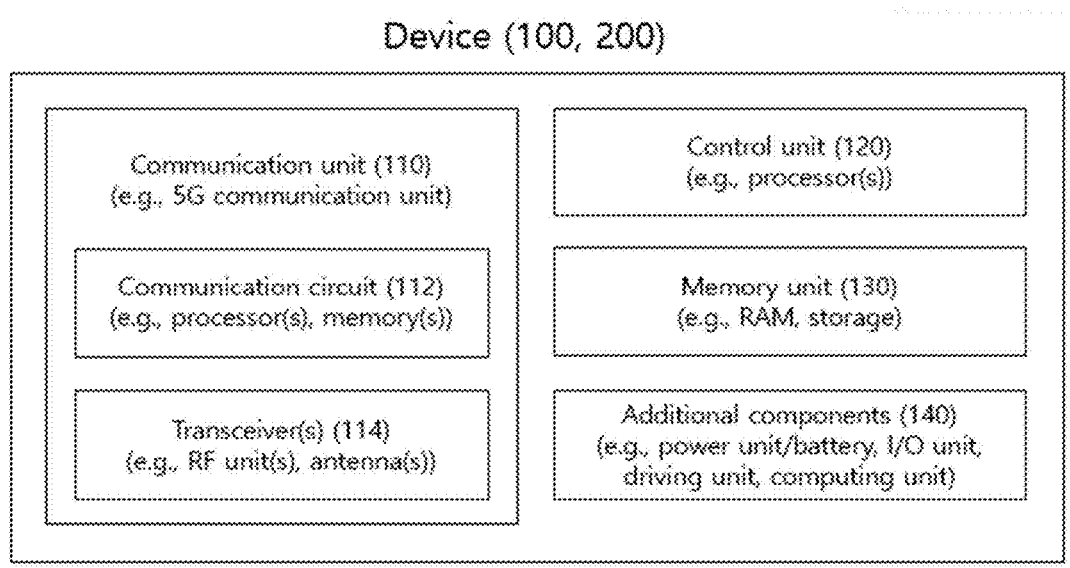

FIG. 22 illustrates another example of a wireless device to which the present disclosure is applied. Wireless devices can be implemented in various forms depending on use-examples/services. (See FIG. 20)

Referring to FIG. 22, the wireless devices 100 and 200 correspond to the wireless devices 100 and 200 of FIG. 21, and may be composed of various elements, components, units and/or modules. For example, the wireless devices 100 and 200 may include a communication unit 110, a control unit 120, a memory unit 130, and additional components 140. The communication unit may include a communication circuit 112 and a transceiver(s) 114. For example, the communication circuit 112 may include one or more processors 102 and 202 and/or one or more memories 104 and 204 of FIG. 21. For example, the transceiver(s) 114 may include one or more transceivers 106, 206 and/or one or more antennas 108, 208 of FIG. 21. The control unit 120 is electrically connected to the communication unit 110, the memory unit 130, and the additional components 140 and controls all operations of the wireless device. For example, the control unit 120 may control the electrical/mechanical operation of the wireless device based on the program/code/command/information stored in the memory unit 130. In addition, the control unit 120 may transmit the information stored in the memory unit 130 to an external (e.g., other communication device) through the communication unit 110 through a wireless/wired interface, or store information received through a wireless/wired interface from an external device (e.g., another communication device) through the communication unit 110 in the memory unit 130.

The additional components 140 may be variously configured according to the type of wireless device. For example, the additional components 140 may include at least one of a power unit/battery, a I/O unit, a driving unit, and a computing unit. Although not limited to this, the wireless device may be implemented in the form of a robot (FIG. 20, 100a), vehicles (FIG. 20, 100b-1, 100b-2), a XR device (FIG. 20, 100c), a mobile device (FIG. 20, 100d), an appliance (FIG. 20, 100e), an IoT device (FIG. 20, 100f), a digital broadcasting terminal, a hologram device, a public safety device, a MTC device, a medical device, a FinTech device (or financial device), a security device, a climate/environment device, an AI server/device (FIG. 20, 400), a base station (FIG. 20, 200), and a network node and the like. The wireless device may be used in a mobile or fixed place depending on the use-example/service.

In FIG. 22, various elements, components, units, and/or modules in the wireless devices 100 and 200 may be entirely interconnected through a wired interface, or at least some may be wirelessly connected through the communication unit 110. For example, in the wireless devices 100 and 200, the control unit 120 and the communication unit 110 may be connected by wire, and the control unit 120 and the first unit (e.g., 130, 140) may be connected wirelessly through the communication unit 110. In addition, each element, component, unit, and/or module in the wireless device 100 and 200 may further include one or more elements. For example, the control unit 120 may be composed of one or more processor sets. For example, the control unit 120 may be composed of a set of a communication control processor, an application processor, an electronic control unit (ECU), a graphic processing processor, and a memory control processor. As another example, the memory unit 130 may be composed of a random access memory (RAM), a dynamic RAM (DRAM), a read only memory (ROM), a flash memory, a volatile memory, and a non-volatile memory and/or a combination thereof.

Figure 23:
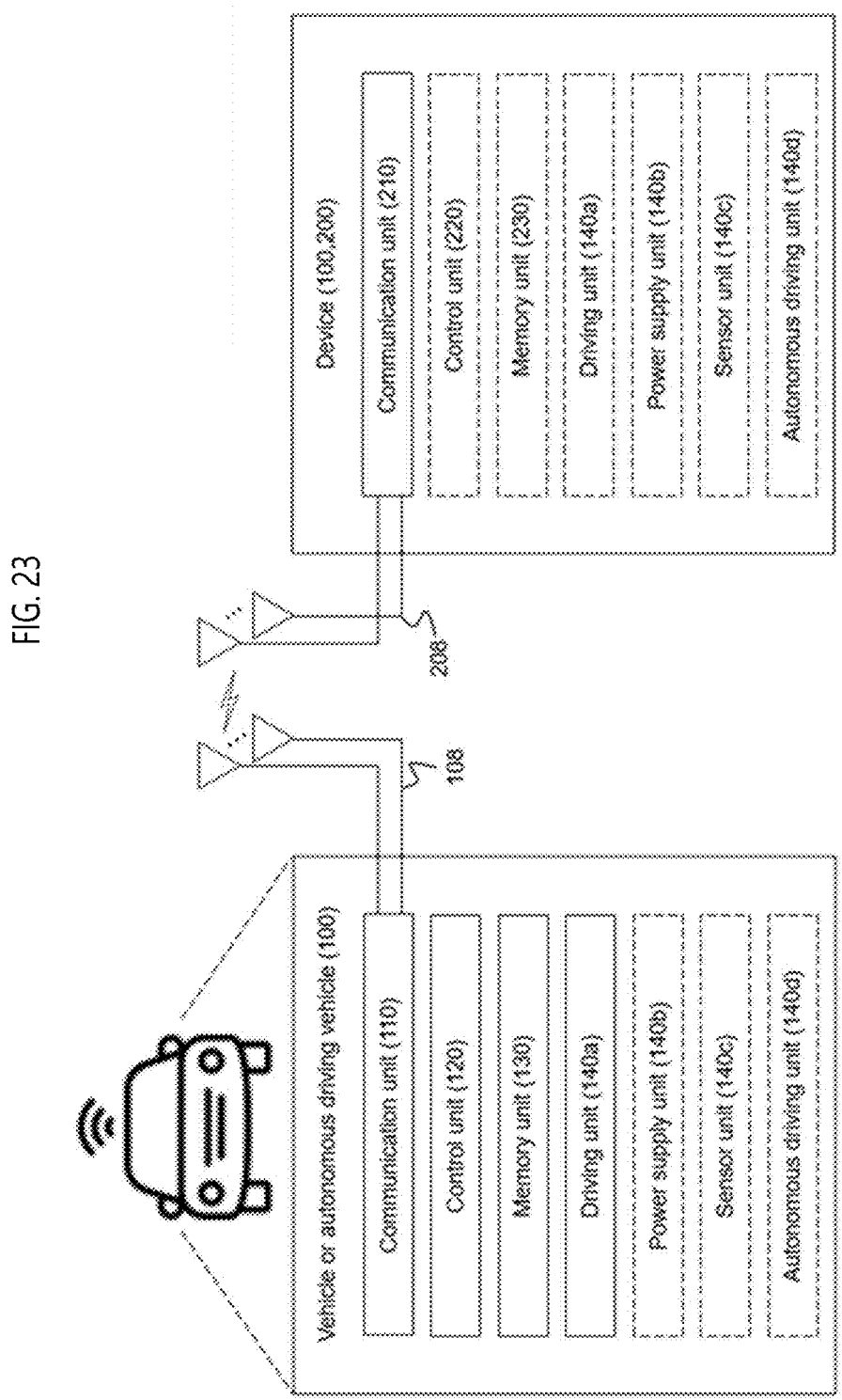

FIG. 23 illustrates a vehicle or an autonomous driving vehicle to which the present disclosure is applied. The vehicle or the autonomous driving vehicle may be implemented as a mobile robot, a vehicle, a train, an aerial vehicle (AV), a ship, and the like.

Referring to FIG. 23, the vehicle or the autonomous driving vehicle 100 may include an antenna unit 108, a communication unit 110, a control unit 120, a driving unit 140a, a power supply unit 140b, a sensor unit 140c and an autonomous driving unit 140d. The antenna unit 108 may be configured as a part of the communication unit 110. Blocks 110/130/140a-140d correspond to blocks 110/130/140 of FIG. 22, respectively.

The communication unit 110 may transmit and receive signals (e.g., data, control signals, etc.) with external devices such as other vehicles, base stations (e.g., base stations, roadside units, etc.), servers, and the like. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to run on the ground. The driving unit 140a may include an engine, a motor, a power train, a wheel, a brake, a steering device, and the like. The power supply unit 140b supplies power to the vehicle or the autonomous driving vehicle 100, and may include a wired/wireless charging circuit, a battery, and the like. The sensor unit 140c may obtain vehicle status, surrounding environment information, user information, and the like. The sensor unit 140c may include an inertial measurement unit (IMU) sensor, a collision sensor, a wheel sensor, a speed sensor, an inclination sensor, a weight sensor, a heading sensor, a position module, a vehicle forward/reverse sensor, a battery sensor, a fuel sensor, a tire sensor, a steering sensor, a temperature sensor, a humidity sensor, an ultrasonic sensor, an illuminance sensor, a pedal position sensor, and the like. The autonomous driving unit 140d may implement a technology for maintaining a driving lane, a technology for automatically adjusting speed such as adaptive cruise control, a technology for automatically driving along a predetermined route, a technology for automatically setting a route when a destination is set, etc.

For example, the communication unit 110 may receive map data, traffic information data, and the like from an external server. The autonomous driving unit 140d may generate an autonomous driving route and a driving plan based on the acquired data. The control unit 120 may control the driving unit 140a to move the vehicle or the autonomous driving vehicle 100 along the autonomous driving path (e.g., speed/direction adjustment) according to the driving plan. During autonomous driving, the communication unit 110 may obtain the latest traffic information data from an external server aperiodically/periodically, and may acquire surrounding traffic information data from surrounding vehicles. Also, during autonomous driving, the sensor unit 140c may acquire vehicle state and surrounding environment information. The autonomous driving unit 140d may update the autonomous driving route and driving plan based on the newly acquired data/information. The communication unit 110 may transmit information about a vehicle location, an autonomous driving route, a driving plan, and the like to an external server. The external server may predict traffic information data in advance using AI technology or the like based on information collected from the vehicle or the autonomous driving vehicles, and may provide the predicted traffic information data to the vehicle or autonomous driving vehicles.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

The present disclosure can be used in a terminal, a base station, or other equipment of a wireless mobile communication system.

What is claimed is:

1. A method performed by a user equipment (UE) in a wireless communication system, the method comprising:
receiving downlink control information (DCI) for scheduling physical downlink shared channel (PDSCH), wherein the DCI includes a first PDSCH group index, wherein a second PDSCH group index is determined based on the first PDSCH group index, and wherein the DCI includes a first new feedback indicator (NFI) value corresponding to the first PDSCH group and a second NFI value corresponding to the second PDSCH group;
generating first HARQ-ACK information related to the first NFI value and second HARQ-ACK information related to the second NFI value;
based on third HARQ-ACK information corresponding to a semi-persistent scheduling (SPS) PDSCH being transmitted with the first and second HARQ-ACK information, appending the third HARQ-ACK information after the first and second HARQ-ACK information; and
transmitting the first and second HARQ-ACK information and the third HARQ-ACK information.

2. The method of claim 1, wherein HARQ-ACK retransmission is allowed for the first and second HARQ-ACK information, respectively, but HARQ-ACK retransmission is not allowed for the third HARQ-ACK information.

3. The method of claim 1, wherein the first and second HARQ-ACK information and the third HARQ-ACK information is transmitted in an unlicensed band.

4. A user equipment (UE) configured to operate in a wireless communication system, the UE comprising:
at least one transceiver for transmitting and receiving a wireless signal;
at least one processor for controlling the at least one transceiver; and, at least one memory connected to the at least one processor and storing instructions that, based on being executed by the at least one processor, perform operations comprising:

receiving downlink control information (DCI) for scheduling physical downlink shared channel (PDSCH), wherein the DCI includes a first PDSCH group index, wherein a second PDSCH group index is determined based on the first PDSCH group index, and wherein the DCI includes a first new feedback indicator (NFI) value corresponding to the first PDSCH group and a second NFI value corresponding to the second PDSCH group;

generating first HARQ-ACK information related to the first NFI value and second HARQ-ACK information related to the second NFI value;

based on third HARQ-ACK information corresponding to a semi-persistent scheduling (SPS) PDSCH being transmitted with the first and second HARQ-ACK information, appending the third HARQ-ACK information after the first and second HARQ-ACK information; and transmitting the first and second HARQ-ACK information and the third HARQ-ACK information.

5. The UE of claim 4, wherein HARQ-ACK retransmission is allowed for the first and second HARQ-ACK information, respectively, but HARQ-ACK retransmission is not allowed for the third HARQ-ACK information.

6. The UE of claim 4, wherein the first and second HARQ-ACK information and the third HARQ-ACK information is transmitted in an unlicensed band.

7. A base station configured to operate in a wireless communication system, the base station comprising:

at least one transceiver for transmitting and receiving a wireless signal;

at least one processor for controlling the at least one transceiver; and, at least one memory connected to the at least one processor and storing instructions that, based on being executed by the at least one processor, perform operations comprising:

transmitting downlink control information (DCI) for scheduling physical downlink shared channel (PDSCH), wherein the DCI includes a first PDSCH group index, wherein a second PDSCH group index is determined based on the first PDSCH group index, and wherein the DCI includes a first new feedback indicator (NFI) value corresponding to the first PDSCH group and a second NFI value corresponding to the second PDSCH group; and receiving first HARQ-ACK information related to the first NFI value and second HARQ-ACK information related to the second NFI value, wherein, based on third HARQ-ACK information corresponding to a semi-persistent scheduling (SPS) PDSCH being transmitted with the first and second HARQ-ACK information, the third HARQ-ACK information is appended after the first and second HARQ-ACK information.

* * * * *